United States Patent [19]
Faraci et al.

[11] Patent Number: 5,517,816
[45] Date of Patent: May 21, 1996

[54] MODULAR ROTARY ENGINE, AND POWER TRAIN ASSEMBLY COMPRISING SAME

[76] Inventors: John A. Faraci; Anthony J. Nino, both of 1222 Clarendon St., Durham, N.C. 27705

[21] Appl. No.: 143,088

[22] Filed: Oct. 26, 1993

[51] Int. Cl.$^6$ ..................................................... F02C 5/02
[52] U.S. Cl. ............................................ 60/39.42; 60/39.75
[58] Field of Search ................................ 60/39.43, 39.44, 60/39.75, 39.08, 39.42; 184/43, 6.11, 13.1; 415/92; 418/83, 87; 123/41.15, 41.29

[56] References Cited

U.S. PATENT DOCUMENTS

| | | |
|---|---|---|
| 886,641 | 5/1908 | Robbins . |
| 895,603 | 8/1908 | Brummer ............................ 60/39.42 |
| 1,025,117 | 5/1912 | Boyer . |
| 1,071,823 | 9/1913 | Sutphin . |
| 1,187,293 | 6/1916 | Faurot . |
| 1,201,836 | 10/1916 | Lennen ............................... 60/39.44 |
| 1,332,367 | 3/1920 | Stewart . |
| 2,444,213 | 6/1948 | Weeks ..................................... 60/41 |
| 3,057,157 | 10/1962 | Close .................................. 60/39.63 |
| 3,273,342 | 9/1966 | Eickmann ........................... 60/39.63 |
| 3,844,113 | 10/1974 | Lockwood ......................... 60/39.43 |
| 3,899,874 | 8/1975 | Bailey et al. ...................... 60/39.34 |
| 3,937,009 | 2/1976 | Coleman ........................... 60/39.35 |
| 4,413,486 | 11/1983 | Irwin .................................. 60/39.63 |
| 4,648,485 | 3/1987 | Kovaleski ........................... 184/13.1 |
| 4,726,324 | 2/1988 | Itakura ............................... 123/41.29 |
| 4,759,316 | 7/1988 | Itakura ............................... 123/41.29 |
| 5,121,714 | 6/1992 | Susa et al. ......................... 123/41.29 |

FOREIGN PATENT DOCUMENTS

| | | | |
|---|---|---|---|
| 457151 | 5/1913 | France ................................. 60/39.44 |
| 18667 | 12/1914 | France ................................. 60/39.44 |
| 670896 | 12/1929 | France ................................. 60/39.44 |
| 393849 | 4/1924 | Germany ............................. 60/39.44 |
| 2357985 | 10/1974 | Germany ............................. 60/39.44 |
| 19537 | 9/1914 | United Kingdom .................. 60/39.44 |
| 143976 | 6/1920 | United Kingdom ...................... 415/92 |
| 569329 | 5/1945 | United Kingdom .................. 60/39.94 |

*Primary Examiner*—Richard A. Bertsch
*Assistant Examiner*—William Wicker
*Attorney, Agent, or Firm*—Steven J. Hultquist

[57] ABSTRACT

A rotary engine having a rotor mounted in an engine block for rotation and operable for rotation in either of opposing rotational directions. In one aspect, the rotary engine comprises an oil slinger concurrently rotatable to centrifugally disperse lubricants to interior surfaces of the engine block and rotor. In another aspect, the rotor may utilize a swept-back saw-toothed configuration or a cruciform arcuate shape. The rotary engine of the invention can be provided as a plurality of engine modules which are operatively interconnected to form a power train of desired size and capacity.

1 Claim, 18 Drawing Sheets

5,517,816

MODULAR ROTARY ENGINE, AND POWER TRAIN ASSEMBLY COMPRISING SAME

BACKGROUND OF THE INVENTION

1. Field of the Invention

This invention generally relates to rotary combustion engines, and more specifically to an engine of such type which can be reversed in its direction of rotation, which are readily manufactured, easily serviced with quick access capability in relation to their main interior component parts, and are operational with a wide variety of combustible fuels.

2. Description of the Related Art

Conventional piston-driven internal combustion engines have various inherent disadvantages with respect to their bulk or power-to-weight ratio, serviceability, and efficiency of operation. Conversely, rotary-driven engines are lighter and more compact, more easily serviced and more efficient due to greater energy being transformed into motive force instead of vibration. The rotating nature of the engine renders its component parts less subject to catastrophic failure as they are not enduring continuous acceleration/ deceleration cycles as is necessary in conventional piston-driven engines with a crankshaft. Rotary engines can burn many different fuels in addition to gasoline which enables rotary engines to be more versatile in their use.

The rotary engine has had many embodiments. In a common configuration, the engine is a rotating wheel with compartments or small "buckets" in which the fuel mixture explodes and impels the rotary portion of the engine. Robbins (U.S. Pat. No. 886,641), Boyer (U.S. Pat. No. 1,025,117) and Stewart (U.S. Pat. No. 1,332,367) exemplify such type of arrangement. Boyer's engine has the additional feature of swinging abutments in the compartments which are driven radially outward by centrifugal force as the rotor revolves. The swinging abutments serve the dual purpose of compressing the fuel mixture prior to ignition and forcing the gaseous by-products out the exhaust ports. Stewart describes a steam-driven rotor co-joined with the explosive fuel-driven rotor to more effectively use the heat generated by the burning fuel. Other rotary engines have been developed by Sutphin (U.S. Pat. No. 1,071,823) and Faurot (U.S. Pat. No. 1,187,293) where the gases are exploded in a cylinder, such as in a conventional piston and cylinder arrangement, and the exploding gases are used to drive a turbine. Sutphin further utilizes a valve arrangement so that the rotation of the turbine can be reversed.

The prior art rotary engines and turbine engines, while combining many important and useful features which distinguish them over piston-driven engines, are not widely used. In large part they suffer from extreme frictional wear in the proximity of the contact between the rotating cylinder and the engine housing, as well as a general inability to effectively dissipate the waste heat produced by combustion. Furthermore, an efficient and readily reversible configuration of such engine is difficult to design.

Accordingly, it is an object of the present invention to provide a combustion-type rotary engine with improved lubrication.

Another object of the invention is the provision of a rotor arrangement which is readily reversible in direction.

Another object of the present invention is the provision of a removable engine cover which permits improved serviceability of the rotor and other internal parts in a rotary engine.

A further object of the present invention is the provisions of a rotary engine unit which is compact and which can be linkably joined to other such units to create power trains of varying size and capacity.

Still another object of the invention is the provision of a compact and efficient cooling system in a rotary combustion engine.

Other objects and advantages of the present invention will be more apparent from the ensuing disclosure and appended claims.

SUMMARY OF THE INVENTION

The present invention generally relates to rotary-type combustion engines, to subassemblies thereof, and to power trains comprising a multiplicity of such rotary engines as interconnected modules of an overall power train.

A preferred aspect of the invention relates to an oil slinger assembly, comprising a rotary member which transmits lubrication by centrifugal force to bearing and frictional surfaces of the engine, e.g., the rotor shaft. The oil slinger in one embodiment comprises a plurality of vanes on the outer surface of the rotor of the rotary engine, which distribute oil or other lubricant by centrifugal force, "slinging" it onto the surrounding wear surfaces, as the rotor is rotated on its associated shaft. Such vanes may be integrally formed with the rotor shaft, or may be separately formed and attached to the shaft by suitable attachment means and/or method, e.g., welding, brazing, mechanical fastening, etc. Alternatively, the slinger may comprise grooves on the surface of the rotor of the rotary engine. The rotor shaft is arranged in the engine block of the rotary engine, sealed by a suitable seal bearing. The slinger carries lubricant out to the lubricant seal from the bearing assembly by centrifugal force, thereby providing a flow of oil or other flowable lubricant medium to an external filter and lubricant reservoir.

In another aspect, the present invention relates to a rotary engine including a housing in which is disposed a rotor which is formed with a plurality of pockets or cavity-defining structures therein. For example, the rotor may be of generally cruciform shape including outwardly extending arms of generally curvate shape, to define scoop-type receptacles or cavities which provide exposure surfaces contactible by the combusting air-fuel mixture to impart rotation to the rotor. For example, the rotor may comprise a swept-back sawtooth configuration or other arrangement of projections, in which the rotor comprises a central rotor body of generally circular cross-sectional shape and rotatable about a central axis of rotation, with a plurality of projections projecting outwardly from the central rotor body. In a highly preferred embodiment, the rotor projections are each bounded by linear leading and trailing edges converging to a peripheral tip, with the trailing edge having a radial alignment to the central axis of the rotor and the leading edge having a tangential alignment to the central rotary body. By such configuration, a plurality of compartments is defined in the housing, between adjacent facing surfaces of successive rotary projections of the rotary, which provide the aforementioned gas contactible surface area for the expanding air/fuel mixture, as it is being combusted, to exert a rotational force on the projections and rotor in operation of the rotary engine.

In a still further aspect, the present invention relates to a rotary engine comprising a housing defining a plurality of peripherally disposed combustion and exhaust chambers, with the housing containing a rotor defining a plurality of rotor compartments, e.g., of arcuate shape, arranged to permit selective reversing of the direction of rotation, and which also can be used as a braking mechanism for slowing down of the rotor, and/or changing its direction of rotation, e.g., from a clockwise rotational direction to a counter-clockwise direction, or vice versa. For example, the braking pocket arrangement may comprise a series of pockets alternating with the main compartments of the rotor, wherein the pockets are of appropriate size, shape and orientation to receive the expanding gas (exploding air/fuel mixture) during rotation of the rotor, and to retard and/or reverse the direction of rotation. Thus, the main compartments of the rotor may be swept back in a first (radial/circumferential) direction, and the braking pockets may be arranged in a second, opposing direction, with each of such cavities or volumes (of the respective main compartments and braking pockets) being arranged to receive combusting gases from a separate set of ignition/combustion chambers, such as a first air/fuel mixture feed manifold feeding the main compartments, and a second air/fuel mixture feed manifold feeding the braking pockets. This arrangement of main compartments and braking pockets provides a braking mechanism which does not require frictional contact of a pad and cylinder as is conventionally employed with most internal combustion engine braking mechanisms, and which also does not require a separate braking mechanism to be attached to the power train.

In another aspect, the present invention utilizes an engine cover which is readily removable to permit servicing of the internal parts of the rotary engine.

In yet another aspect, the present invention utilizes the modular construction of the rotary engine described hereinabove, to provide linkable modular motive units, which can be operatively coupled to yield a power train of selected variable size and capacity. Such coupling or "training" of the rotary engine modules facilitates a multiplicity of uses for the power train, and further increases the serviceability of each of the modular rotary engine components, since spare units are readily introduced into a position in the power train occupied by rotary engine modules in need of servicing, so that substantially reduced downtime in operation may be achieved by such ready removability and substitution of modules in the overall power train.

In another aspect, the present invention relates to a rotary engine which utilizes a bearing which is easily removed for servicing, without major disassembly of the rotary engine.

A further aspect of the invention relates to a rotary engine utilizing an outer oil (or other lubricant) seal which incorporates a race for the shaft bearing, and external threads to retain pressure on the bearing, and a sealing surface which communicates with the main shaft to prevent oil leakage.

In another aspect, the invention relates to a rotary engine which utilizes fuel which is injected into the combustion chamber in either a liquid or gaseous form, from either a high pressure gaseous fuel supply reservoir, or a liquid reservoir (which in the case of fuels of low boiling point, e.g., liquefied natural gas, may be provided with suitable cooling or chilling means).

In another aspect, the rotary engine of the present invention utilizes a combustion cap, which is disengagingly coupled, e.g., by threading or other securement means, to the engine block, to define an upper portion of the combustion chamber. Such cap incorporates openings, passageway structure, and/or fittings for injection of fuel and air (or other oxygen-containing gas) into the combustion chamber, and means for igniting the fuel mixture in the combustion chamber, such as a conventional spark plug. The cap, being disengagably coupled to the block, preferably by matable threadings on the cap engageable with complementarily formed matable threadings in the block opening receiving the cap, is thereby readily removed for maintenance and/or inspection of the internal parts of the engine.

In still another aspect, the present invention relates to a cooling system for a rotary engine, which is usefully employed to dissipate the waste heat deriving from combustion of fuel in the combustion chambers of the engine. The cooling system can be operated as a split system providing backup cooling capability in the event of failure of the operating portion of the split system, or for providing additional cooling capability, beyond the maximum heat transfer load accommodated by the operating portion of the split system. Such cooling system may usefully employ any suitable coolant medium as the heat transfer fluid therein.

The invention in various aspects thus relates to the design of the rotor and its compartments, the location of intake and exhaust ports which connect the compartments to the explosive fuel mixture and permit egress of exhaust gases, the rotating oil slinger, the exterior shaft seal, the compactness and linkability of the rotary engine units, and the easily removable engine covers.

The invention may be practiced with any suitable rotor designs, however two specific rotor embodiments are highly preferred, each of which is adapted for specific functioning of the rotary engine.

One such preferred embodiment of the rotor includes a plurality of compartments defined by the above-described swept-back sawtoothed rotor configuration comprising a central rotor body of generally circular cross-sectional shape and rotatable about a central axis of rotation, with rotor projections bounded by linear leading and trailing edges converging to a peripheral tip, wherein the trailing edge has a radial alignment to the central axis of the central rotor body and the leading edge of the rotor projection has a tangential alignment to the central rotor body. When viewed from the end of the rotating shaft, the outline of the compartments provide a sawtooth silhouette circumferentially extending around the periphery of the rotor. The above configuration provides compartments into which the explosive gases can expand and impel the rotor in a rotating manner. The rotary engine block or housing has one or more combustion chambers communicating with the interior volume in which the rotor is disposed. Each of the combustion chambers is covered with a combustion cup which has one or more intake ports for introduction of a fuel mixture and another port having a spark plug disposed therein for igniting the fuel mixture. Each of the combustion chambers contains an aperture which communicates with the internal portion of the engine block where the rotor is situated. The combustion chambers are located within the engine block but they are externally disposed with respect to the compartments in the rotor. Therefore, the explosion takes place in the engine block, external to the rotor, and is directed through the aperture in the combustion chamber toward the compartments which are defined by and lie between circumferentially adjacent rotor projections, about the circumference of the rotor. The combustion chamber generally converges as it approaches the aperture so that the explosive power of the combusted fuel mixture will be more forcefully directed toward the rotor compartments. With the swept-back sawtooth rotor configuration, the explosive gases are directed toward the trailing edge having a radial alignment to the central axis of the rotor, thereby effecting a tangentially directed force on the rotor.

It will be appreciated from the ensuing description hereinafter that the rotor may comprise any suitable number, shape and size projections, pockets, compartments, or other structure providing impeller surfaces receiving the thrust of the expanding combusting gases from the combustion chamber and correspondingly being driven by such gas thrust/expansion in a desired direction of rotation. Correspondingly, the combustion chambers may be arranged in any suitable size, shape, number, and orientation in relation to the rotor and its rotation-inducing, gas-contact surfaces, to maximize the efficiency or otherwise achieve a desired operational result.

An alternative preferred rotor design has a plurality of compartments defined around the central shaft of rotor. The compartments are each of an arcuate shape, which may comprise an arcuate bounding wall profile approaching a complete semicircle. Such compartment design defines a cruciform cross-sectional shape, wherein the arcuate wall surface of the each compartment is substantially perpendicular at its outer extremity to the adjacent outer arcuate wall surface defining the extremity of the rotor projection. When such rotor, with its compartments defined by continuous interior bounding surfaces of arcuate character, is disposed in an engine block with a plurality of intake and exhaust ports which are appropriately positioned in opposing tangential arrangement with respect to the rotor, a braking action can be achieved by directing the explosive force toward the rotor compartment wall in direct opposition to the direction of motion. Furthermore, with continued application of the explosive force opposite to the direction of motion, the rotation can be completely reversed from its initial direction. The retardation or reversal of rotation may be effectuated by a microprocessor or computer-controlled "firing" arrangement, in which the timing and character of combustion "pulses" imparted to the compartments, pockets, vanes or other control structure of the rotor, is carried by the microprocessor or computer control means, in such manner as to avoid "shock" or translational stresses on the rotor or associated shaft and other components of the engine drive train. As is obvious from the foregoing discussion, only a portion of the combustion chambers are necessarily used at any time, otherwise the engine would not rotate or it would function only in a slightly reciprocating manner.

In another aspect, the rotary engine may comprise a rotor mounted on a central shaft and having about its central shaft a recess. Within this recess are located a plurality of vanes which extend radially outwardly and function as oil slinging elements. The vanes extend outwardly to a position which is less than the radius defined by the innermost portion of the compartments in which explosive gases are directed from the combustion chambers. The oil slinger functions by centrifugal force to direct oil outwardly to effectively lubricate the main shaft and bearing, and interstices of the engine block, thereby reducing frictional effects and wear. The oil slinger is retained in position by the cylinder seal, as hereinafter more fully described.

In addition to the combustion chambers and exhaust chambers, the engine block in the rotary engine of the present invention may contain cooling channels which permit the flow of coolant. Such cooling channels may be formed and arranged in any appropriate fashion, to effect appropriate cooling of the engine.

The cover of the engine block which effectively retains the rotor within the engine block can have cooling capabilities as well. Fins may be deployed along its exterior surface to effect cooling via a dissipative convective action. In another configuration, the cover may comprise channels through which a suitable coolant is circulated. Further, a combination of circulating coolant and convective cooling fins can be used to cool the engine. The engine block may held in position by conventional attachment means such as bolts which may pass through one of the engine covers, the engine block, and the other engine cover, being fixedly held in position by a nut or other locking fastener element. In an alternative configuration, the engine block may be internally threaded to fixedly retain one or more conventional bolts in place after the bolts have passed through the appropriate apertures in the engine covers. Since the engine covers are held in place by conventional and easily removable means, the interior of the rotary engine is readily serviceable by removal of a limited number of parts.

The rotary engine units can be constructed in a compact modular and linkable form to effect the assembly of power trains of varying size and capacity. The linkage of consecutive rotary engine modules may be effected by any suitable means. In one arrangement, a drive shaft may be employed, which extends from the engine designed with a plurality of key ways and an aperture and an aperture in which is disposed a fastening means such as a conventional bolt. A threaded aperture may be advantageously employed when the fastening means is a conventional bolt. The modular rotary engine units may be linked to each other with a coupling which has a plurality of ridges radially spaced about its interior surface, to effect substantial registration with the key ways in the shaft of the engines to be coupled. The coupling may also feature apertures in which may be disposed securing means such as conventional bolts. In such arrangement, wherein a multiplicity of rotary engine modules including a corresponding multiplicity of rotors mounted on a common shaft is utilized, a change in the number of engine modules in the power train is readily effected, by uncoupling and/or coupling the required number of engine modules in the overall power train assembly. To uncouple an engine it is only necessary to remove the fastening means and to slide the coupling along the shaft of one of the engines until it is clear of the shaft of the other engine, when separate shafts are utilized in connection with each rotary engine module. A torque-responsive break-away coupling may also be employed, in multi-module power trains, so that if one or more engine modules bind or seize, the coupling will shear or otherwise break, so that the binding or seized module(s) thereby are transformed to a "free-wheeling" or non-driving state, whereby power output of the multi-module power train, although attenuated, is not interrupted.

Thus, the rotary engine may be variously configured, with either a common power shaft, on which the sequential rotors of the respective coupled modules are mounted, or alternatively, each rotary engine module may have its own rotor shaft, which may be coupled with the rotor shafts of adjacent modules in the overall power train.

Furthermore, if one or more engines in a power train are not functioning properly, the entire power train system need only be shut down to remove the engines which need servicing. A spare engine, or spare engines, can be substituted, if necessary, and the system restarted with a limited amount of downtime, far below what is required in servicing of prior art engines and power trains.

Other aspects, features and advantages of the present invention will be more fully apparent from the ensuing disclosure and appended claims.

DETAILED DESCRIPTION OF THE INVENTION, AND PREFERRED EMBODIMENTS THEREOF

Figure 1:
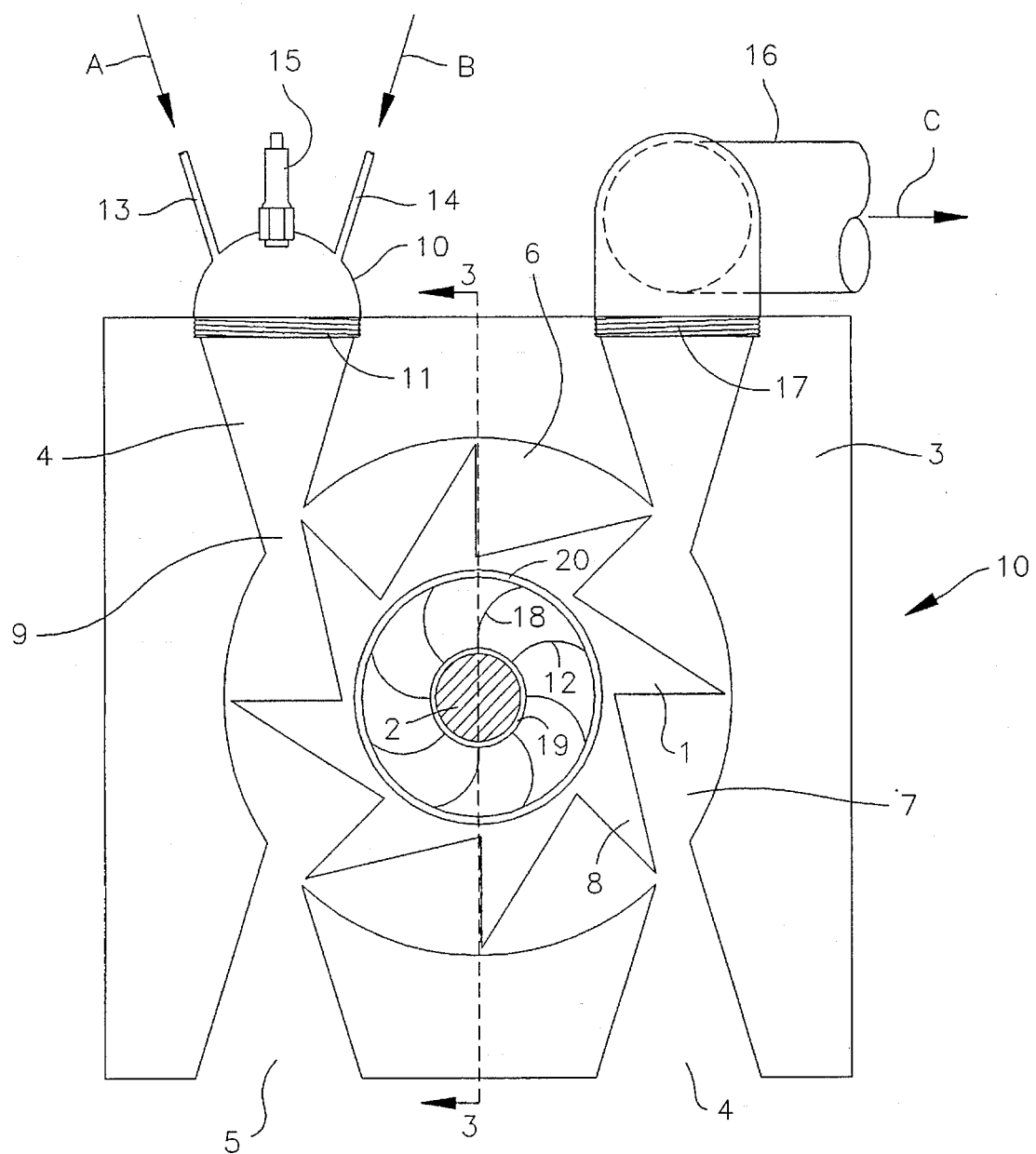
FIG. 1 is a plan view of a rotor and engine block with the covers removed, in a rotary engine according to one embodiment of the present invention.

The present invention relates to combustion-type rotary engines, preferably of a type wherein a rotor defining a plurality of compartments circumferentially spaced about the periphery of the rotor, between adjacent projections or spokes (vanes) of the rotor, is rotated about a central rotor axis in an interior volume of an engine block, with the interior volume being connected to a chamber in which an exploding fuel mixture is ignited by conventional spark plug or other ignition means, and with the resulting explosive force being directed against a wall surface of the rotor, to impart a tangential force to the rotor which in turn causes the rotor to rotate about its central axis (in this respect, the rotor may be appropriately mounted on a rotor shaft rotatable about such central axis).

The rotor may for example have a swept-back sawtooth rotor configuration as previously described herein, wherein a central rotor body of generally circular cross-sectional shape is rotatable about a central axis of rotation, and the central rotor body has a plurality of rotor projections joined to and extending outwardly therefrom, wherein the rotor projections are each bounded by linear leading and trailing edges converging to a peripheral tip, which may be pointed in shape, or of any other suitable form, such as a thickened tip or enlarged outer extremity. Tip wear of the rotor extremities is not of major concern, since the tip's outermost surface is in spaced relationship to the bounding wall surface(s) of the rotor cavity of the engine block; the blow-by of combusting gases between the tip's outermost surface and the portion of the bounding wall surface(s) of the rotor cavity proximal to such outermost surface is readily accommodated, and significant spacing between the tip outermost surface and the bounding wall surface is allowable, particularly when the engine is operated on high BTU content fuels such as hydrogen. In any case, the outermost surface of the rotor should not contact the adjacent bounding wall surface of the rotor cavity, to avoid scoring of the cavity wall, unnecessary generation of frictional heat, and wearing of the rotor tips.

In the swept-back sawtooth rotor configuration, the trailing edge has a radial alignment with respect to the central axis and the leading edge has a tangential alignment to the central rotor body.

In another rotor configuration, the rotor may be of cruciform shape in cross-sectional view, with continuously arcuate concave wall surfaces defining cavities between adjacent arms or projections of the rotor, and wherein the outer wall surface portions of the compartments or cavities are substantially perpendicular to the outer convex (cylindrical) wall surface of the rotor extremity. By such arrangement, arcuate compartment configuration is provided which permits reversing of the direction of rotation and may be usefully employed as a braking mechanism for slowing down the rotor in operation, by the simple expedient of directing exploding fuel mixture against the arcuate surfaces of the compartments of the rotor, opposite to the direction of rotation of the rotor.

As discussed hereinabove, the rotor, with compartments defined by continuous interior bounding surfaces of arcuate character, may be disposed in an engine block with a plurality of intake and exhaust ports which are appropriately positioned in opposing tangential arrangement with respect to the rotor, whereby a braking action can be achieved by directing the explosive force toward the rotor compartment wall in direct opposition to the direction of motion. Furthermore, with continued application of the explosive force opposite to the direction of motion, the rotation can be completely reversed from its initial direction. The retardation or reversal of rotation may be effectuated by a microprocessor or computer-controlled "firing" arrangement, in which the timing and character of combustion "pulses" imparted to the compartments, pockets, vanes or other control structure of the rotor, is carried by the microprocessor or computer control means, in such manner as to avoid "shock" or translational stresses on the rotor or associated shaft and other components of the engine drive train.

It is not unusual for prior art rotary engines to suffer from extreme frictional wear, especially at the point contacts between the outer periphery of the rotor and the bounding surfaces of the engine block in which the rotor rotates. This deficiency is overcome in the rotary engine of the present invention, wherein the rotor is disposed in the rotor cavity of the engine block without the tips or other outer extremity portions of the rotor contacting the bounding wall surface(s) of the engine block.

The present invention in one aspect utilizes an oil slinger which may be suitably constructed with vanes, e.g., of arcuate, linear or other shape, which emanate generally radially from the central shaft of the rotor; a radial, linear vane configuration may be usefully employed in engine systems featuring reversible slinger operation. The vanes of the oil slinger transfer oil to the rotor, the bearing and the interstices of the engine block, by slinging the lubricant outwardly as the oil slinger turns. The transfer of oil along the vanes is effected by centrifugal force. The oil slinger may suitably be constructed as the central cylindrical collar element from which a plurality of circumferentially spaced-apart, generally outwardly extending vane elements extend, and the vanes preferably are swept-back, and preferably arcuate, in configuration.

The rotary engine of the present invention may suitably employ a removable seal plug assembly, and a removable threaded bearing assembly, as hereinafter more fully described. By such arrangement, the bearing assembly may be removed by itself, exclusive of the seal plug assembly, for servicing or replacement, or alternatively, the bearing assembly and the seal plug assembly may both be removed at the same time.

Preferably, the engine block comprises a plug seal cavity containing therein a shaft seal bearing sealingly disposed about the shaft, and a seal plug in compressive bearing relationship against the shaft seal bearing, and leak-tightly sealing the engine block plug seal cavity.

Conventional combustion engines are usually fabricated as a complete unit for a specified application, such as an automobile. Due to the constraints of construction, piston-driven engines are difficult to service due to their complicated construction which renders the interior mechanical elements difficult to access in a quick and ready manner. Further, service renders the entire power train non-operational for the extended periods of time during which service is carried out. The rotary engines of the present invention have the advantageous feature that they may be readily linkably coupled to one another, to form power trains of varying size and capacity. Further, the individual rotary engine units may be selectively removed for servicing with a limited amount of downtime, by replacement of the non-operational unit(s) with functional spare unit(s), or alternatively the power train may be operated with a rotary engine unit missing, if the remaining rotary engine units have sufficient power output for the intended application.

The serviceability of power trains comprising rotary engine units of the present invention is further enhanced by the relative ease of access to the internal portions of the rotary engine. An engine cover may be simply held in place by conventional mechanical coupling means, such as bolts, which are readily removed for servicing of the rotary engine.

In accordance with the present invention, a preferred rotary configuration includes the swept-back sawtooth rotary configuration described hereinearlier, which when viewed in top plan view defines compartments in the interior volume of the engine block or housing, which are bounded by the facing surfaces of adjacent rotor projections, so that each compartment is bounded by the linear facing surfaces of adjacent rotor projections and the bounding circular wall portion of the interior volume of the engine block, which is suitably circular in cross-sectional shape, and of selected depth or thickness commensurate with the depth or thickness of the rotor itself, as will be more fully appreciated with respect to illustrative embodiments described hereinafter. Such configuration provides compartments into which explosive gases may expand and impel the rotor in a selected direction of rotation. To effect a maximum efficiency in transferring explosive energy to useful rotational energy, the explosive force of the combusting fuel preferably is directed against the radial trailing edge of the rotor projections of the swept-back sawtooth configuration rotor.

Alternatively, the rotor may of cruciform shape defining compartments bounded by an inner arcuate wall surface extending to an outer peripheral rotor projection surface which is convex (cylindrical) in shape, and wherein the arcuate bounding wall surface at its outer extremity is generally perpendicular to the outer convex wall surface at the extremity of the rotor projection. This configuration will perform efficiently in either direction of rotation, since the explosive force of combusting fuel can be directed at a wall surface portion of the compartment which will transfer a predominantly tangential force to the rotor, thereby causing it to rotate in a corresponding direction of rotation. Such rotor, with its arcuate wall surfaces and associated compartments, may be placed inside an engine block with a plurality of intake and exhaust ports which are appropriately positioned in opposing tangential arrangement with respect to the rotor. In this embodiment, a braking action may be achieved by directing the explosive force of combusting fuel toward the rotor compartment wall surface in direct opposition to the direction of motion of the rotor. Alternatively, as earlier described herein, the combustion chambers may be arranged, e.g., staggered in configuration, to effect braking and rotational direction reversal, and/or pockets or cavities in the rotor body's outer periphery may be arranged for such braking and re-direction of the rotor, with computer/microprocessor control of the nature and extent of the combustion in the system, as necessary or desired to achieve the motive change in the rotor's operation. Furthermore, with continued application of the explosive force opposite to the direction of motion, the rotation may be completely reversed from its initial direction. As will be appreciated from the previous discussion, only a portion of the combustion chambers may be operational at any time, in order to provide maximum efficiency of the engine.

A preferred configuration for the combustion chambers in the engine block is an outwardly diverging chamber shape which extends through the exterior wall of the engine block and may be threaded to receive a combustion cup. The internal diameter of the combustion chamber thus may progressively narrow toward the interior of the engine block and terminate in an aperture communicating with the internal volume (open cavity) of the engine block in which the rotor is situated. The combustion chamber may be designed to direct the exploding fuel mixture, ignited by conventional spark plug or other ignition means, so that the resulting explosive force is directed into the compartment of the engine block containing the rotor and against a wall of the rotor compartment to impart a tangential force to the rotor which causes the rotor to rotate in a selected direction of rotation, to generate useful motive power.

In a preferred embodiment, the combustion chamber cups may be suitably threaded to permit their attachment to the correspondingly threaded openings of the engine block which define with the combustion cap a combustion chamber. The combustion caps may contain one or more apertures for fuel injection and an aperture which is suitably threaded to receive a conventional spark plug or other ignition means.

Preferably, the exhaust chambers are of similar design, arrangement, and configuration as the combustion chambers. An appropriately designed exhaust pipe may be threadably connected to the engine block at the opening of the exhaust chamber to discharge exhaust gases from the engine block. The engine direction may be reversed by switching the exhaust pipe and the combustion cup, provided that the rotor is appropriately designed to function in either direction of rotation.

In a preferred aspect, the rotor may have about its central shaft a recess, and within such recess may be located a plurality of vanes which extend generally radially outwardly to thereby function as an oil slinger for the engine. The vanes extend outwardly for a distance which is less than the radius defined by the innermost portion of the compartments from which the explosive gases are directed from the combustion chambers. The vanes may be generally radial and sweptback in configuration, being curvate concavely on their leading surfaces and curvate convexly on their trailing surfaces, whereby oil is appropriately slung to an outer periphery during rotation of the oil slinger. In operation, oil enters the engine block through a port, goes through the main bearing, then contacts the slinger, and finally exits through another port. Centrifugal force exerted on the lubricant by the rotating slinger distributes the oil, to thereby effectively lubricate the rotor, interstices, and bearing, to thereby reduce frictional drag and wear on moving parts. The engine cover, as mentioned, is attached to the engine block so as to be readily removable therefrom to allow quick and ready access to the rotor, oil slinger, sealing plug and/or other internal components of the rotor engine.

The engine block comprises main front and rear faces, with front and rear covers on the main front and rear faces, respectively. Each of the front and rear covers comprise coolant passages therein for circulation of coolant medium therethrough, with the coolant passages being joined in fluid flow communication with a source of coolant medium. The coolant passages of the front and rear covers are suitably interconnected with one another to form a continuous coolant flow lccp comprising lccp portions which are isolatable in relation to one another, with means for isolating selected one(s) of said loop portions upon occurrence of leakage from the coolant passages thereof, such as the aforementioned microprocessor or computer control means.

The vanes of the oil slinger may be linear, convoluted, or curvilinear, and preferably is of the aforementioned curvate generally radial character which permits the vanes to efficiently distribute (sling) oil to the rotor and engine block. The vanes are most preferably an arcuate shape radiating out from the central shaft of the rotor, e.g., having the curvate concave leading surface and curvate convex trailing surface configuration previously described, although such oil slinger is also effective in a reverse direction of movement, wherein the curvate concave surface is the trailing surface and the curvate convex surface is the leading surface of the oil slinger.

The engine block may suitably be cooled by circulating a cooling medium through the engine block, in appropriate interior passages thereof, as is common with most combustion engines. In a preferred aspect, the engine coolant system is symmetrical in character, comprising portions which can be separately (independently) utilized. By this arrangement, the separate portions can be independently shut off. For this purpose, the coolant system may be provided with a computer or microprocessor control means and sensors which function to sense any leaks in the fluid flow passages of the overall flow path in the coolant system, and to responsively actuate the computer or microprocessor means to selectively shut off the flow of coolant in the leaking portion of the coolant system. One portion of the coolant system may thus serve as a redundant back-up to the other portion of the coolant system, whereby one of the portions may be inactive while the other portion is active during normal operation, or alternatively, both portions may be active in normal operation, and in the event of leakage in one of the portions, that portion may be bypassed and thereby isolated while the other portion remains in operation. In the latter instance, the computer or microprocessor control means may also function to shut down fuel injection and firing of the ignition means of a portion of the firing ports of the engine, so that the heat generation incident to combustion of fuel is correspondingly reduced to the attenuated capacity of the cooling system in which a portion of the coolant flow path has been taken "off line."

The engine may be cooled by convective cooling to dissipate heat, by the provision of fins on its exterior surface of the cover. More preferably, the engine cover as well as associated engine components, may be cooled by circulation of a cooling medium through the engine cover, through appropriate passage means in or on the cover. Most preferably, the engine cover and associated engine components may be cooled by a combination of convective cooling via extended heat transfer surfaces, e.g., fins or other protuberances, as well as by flowing of cooling medium through channels or passages in or on the engine cover.

The rotary engine of the present invention is modular and compact, and may be utilized to construct power trains of varying size and capacity by coupling of rotary engine modules to one another, via coupling of separate shaft elements of each module to the shaft elements of adjacent modules. In one preferred embodiment, the shaft of the engine module is constructed to engage a coupling mechanism, so that multiple coupling mechanisms and engine modules may be employed to link together any number of rotary engine modules into a power train of suitable size and capacity for the desired end use application. Preferably, the drive shaft which extends from the rotary engine (either being separate from or integral with the rotor) may be provided with a plurality of keyways and an aperture in which a fastening means such as a conventional bolt or other mechanical fastener may be utilized. A threaded aperture in the shaft is preferred when the fastening means is a conventional bolt or set screw fastener element. The rotary engine modules of the invention may be linkably connected to one another with a slidable coupling which has a plurality of ridges radially spaced about its interior surface, to effect registration with keyways in the shaft of adjacent engines to be interconnected with one another. The slidable coupling also has apertures placed therein which will come into substantial registration with apertures in the shaft of the rotary engine modules, such apertures being arranged to receive securing means such as conventional bolts or set screws or the like. To vary the number of engines in the power train, it is only necessary to uncouple the desired number of rotary engine modules from the power train, or to alternatively couple the required number of modules in place in the power train assembly. In uncoupling a rotary engine module, the fastening means may be removed, and the slidable coupling may be translated along the shaft of one of the engines until it is clear of the shaft of the other engine, when each rotary engine module has a separate rotary shaft. Further, if one or more engines in a power train are not functioning properly, or otherwise require service, the entire power train system need only be shut down so long as is required to remove the rotary engine modules in need of servicing. As mentioned hereinearlier, it may be desirable in some applications to utilize a breakaway coupling, involving shear pin or other breakaway members, so that in the event that an engine module in a multi-module train seizes, the associated coupling means breakaway, so that the inoperative module then becomes "free-wheeling" in relation to the other modules in the train.

In the multi-module training of engines, spare engine(s) can be readily substituted in the power train assembly, if required, and the power train system can be restarted, with a limited amount of downtime in relation to prior art internal combustion engine systems.

The rotary engine of the present invention thus accommodates high rpm operation with consequent high internal heat generation and efficient heat dissipation, without sealed tip elements of the rotor, such as have been determined to be extremely disadvantageous in the practice of the prior art. The coolant system associated with the engine is utilized to preferentially blanket the intake and combustion areas of the engine block, to maintain permissible operating temperature levels. The engine may employ a "screw-in" combustion cap which is readily affixed to and removable from the engine block, thereby enhancing the serviceability of the engine. The oil slinger system permits continuous oiling of the bearing of the rotary shaft in operation, to maintain low wear and frictional heat build-up during engine operation.

Further, while the invention has been described primarily in terms of a rotary engine embodiment, it will be apparent that the engine could be adapted for use in pumping and vacuum generation applications.

The invention will now be more fully described as to its various embodiments, as illustrative of the present invention, with reference to the drawings hereof.

FIG. 1 is a top plan view of a rotary engine 10 according to one embodiment of the present invention, in one aspect thereof, with the top cover of the engine removed from the engine block 3 to show the details of construction of the interior rotor 1 and oil slinger 12 elements. The rotor 1 is rotatable about a central rotor shaft 2 which is mounted inside engine block 3, containing combustion chambers 4 and exhaust chambers 5. The rotor is disposed in an interior volume 6 comprising compartments 7 defined by rotor projections or vanes 8, into which the exploding fuel mixture is directed from combustion chambers 4 through apertures 9. A combustion cap 10 is threadably connected to engine block 3 by threading 11 and contains passages 13 and 14 which may be suitably coupled with apertures in the combustion cap, for injection of fuel (in passage 13, flowed thereinto from a suitable source (not shown) in the direction indicated by arrow A, and oxygen-containing gas in passage 14, flowed thereinto from a suitable source (not shown) in the direction indicated by arrow B. The top portion of the combustion cap 10 is also provided with an aperture which is threaded for receiving a spark plug 15 or other ignition means therein. Exhaust pipe 16 is threadably connected by threaded portion 17 to the engine block 3 and is angled away from the engine block, to discharge exhaust gases from the engine in the direction indicated by arrow C.

The oil slinger 12 is comprises a plurality of vanes 18 radiating from the rotor shaft 2, which effectively transmit oil to the rotor shaft and bearing surfaces, as more fully described hereinafter. The oil slinger vanes 18 may be integrally formed with the rotor shaft 2, or may be separately coupled or integrally formed with a cylindrical collar 19 which matingly engages the rotor shaft. An oil seal groove 20 extends circumferentially around the central rotor body as shown, in spaced relation to the central rotor body as shown, and in spaced relation to the ends of the vanes 18 of the oil slinger 12.

Figure 2:
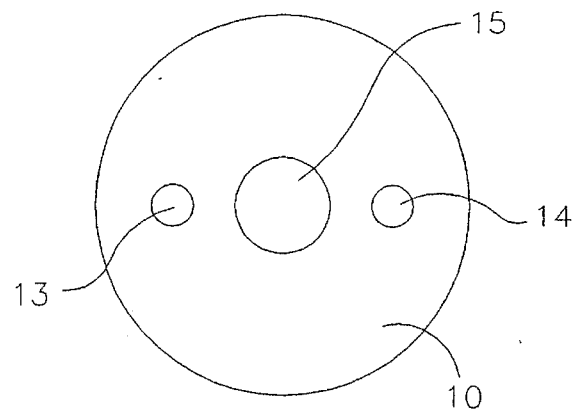
FIG. 2 is a top plan view of a combustion cap of the FIG. 1 rotary engine.

FIG. 2 is a top plan view of the combustion cap 10, showing the fuel injection passage 13, the air (or oxygen-containing gas) injection passage 14 and the spark plug 15.

Figure 3:
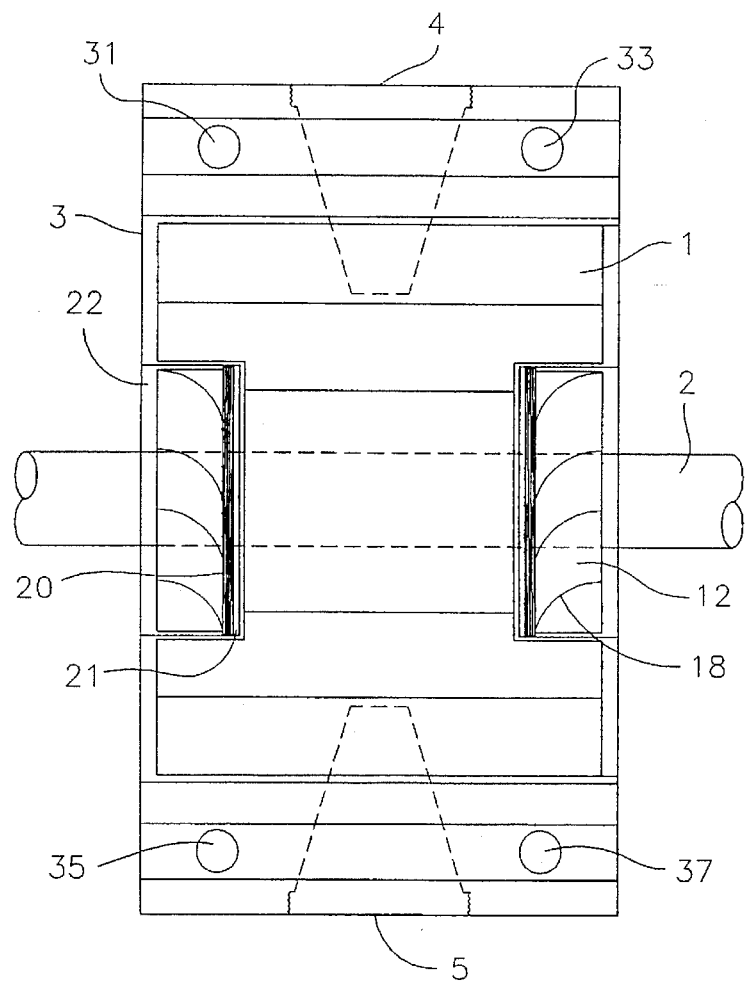
FIG. 3 is a sectional elevation view, taken along the line 3—3 of FIG. 1.

FIG. 3 is a sectional elevational view, along line 3—3 of FIG. 1, showing the details of the rotor 1 and engine block 3. As shown, a coil spring 20 outwardly biases and compresses the oil seal ring 21 and face seal ring 22 in position. The face seal ring 22 may be suitably secured to the engine block by keying and mechanical fastener structure (not shown). The coolant passages 31, 33, 35 and 37 are utilized for circulating a cooling medium through the engine block 3.

Figure 4:
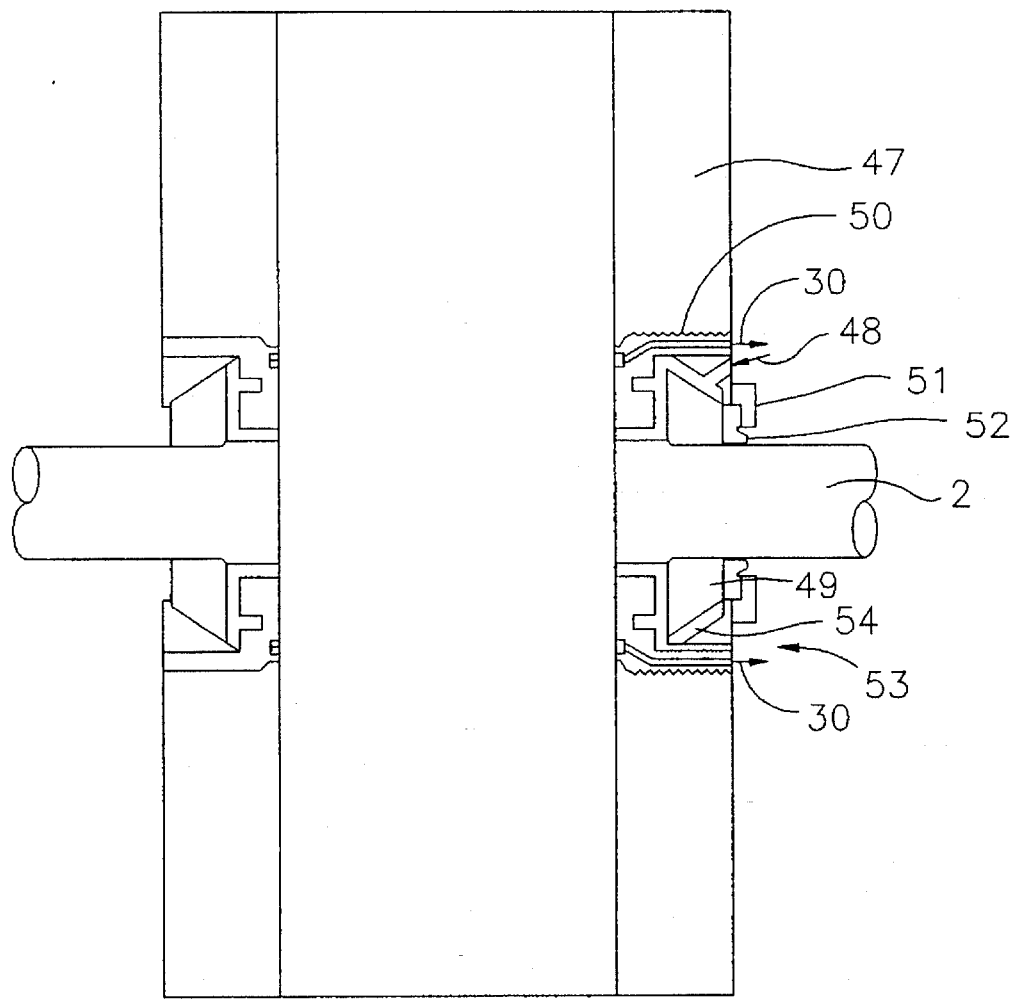
FIG. 4 is a cross sectional view of an engine cover of a rotary engine with removable threaded plugs and a bearing assembly, wherein the central portion of the rotary engine is as described in connection with FIG. 3 hereof.

FIG. 4 is a cross-sectional elevation view of the rotary engine of FIGS. 1–3, showing the arrangement of the rotor shaft 2 and associated elements. The engine cover 47 includes aperture 48 therein for introduction of oil therethrough to the bearing 49 around the rotor shaft 2 and into the oil slinger (not shown in FIG. 4). Apertures 30 permit oil to flow out of the engine cover from the recess (not shown in FIG. 4; see recess 20 in FIG. 1) circumscribing the oil slinger. A hex nut 51 retains a seal gasket 52 around the shaft 2.

The seal gasket 52 may be formed of any suitable material of appropriate diameter, resilience, and physical characteristics.

As shown, the cover 47 is provided at its central opening with threading 50, which is complementarily matable with threading of plug 53 containing the oil outlet passages 30. Race 54 accommodates bearing 49 and low pressure oil inlet 48 communicates with the race 54, to effectuate contacting of lubricant with the bearing.

The low pressure oil inlet 48 is suitably connected to an oil filter and lubricant reservoir (not shown) providing a gravity-feed lubrication system for the rotary engine.

Figure 5:
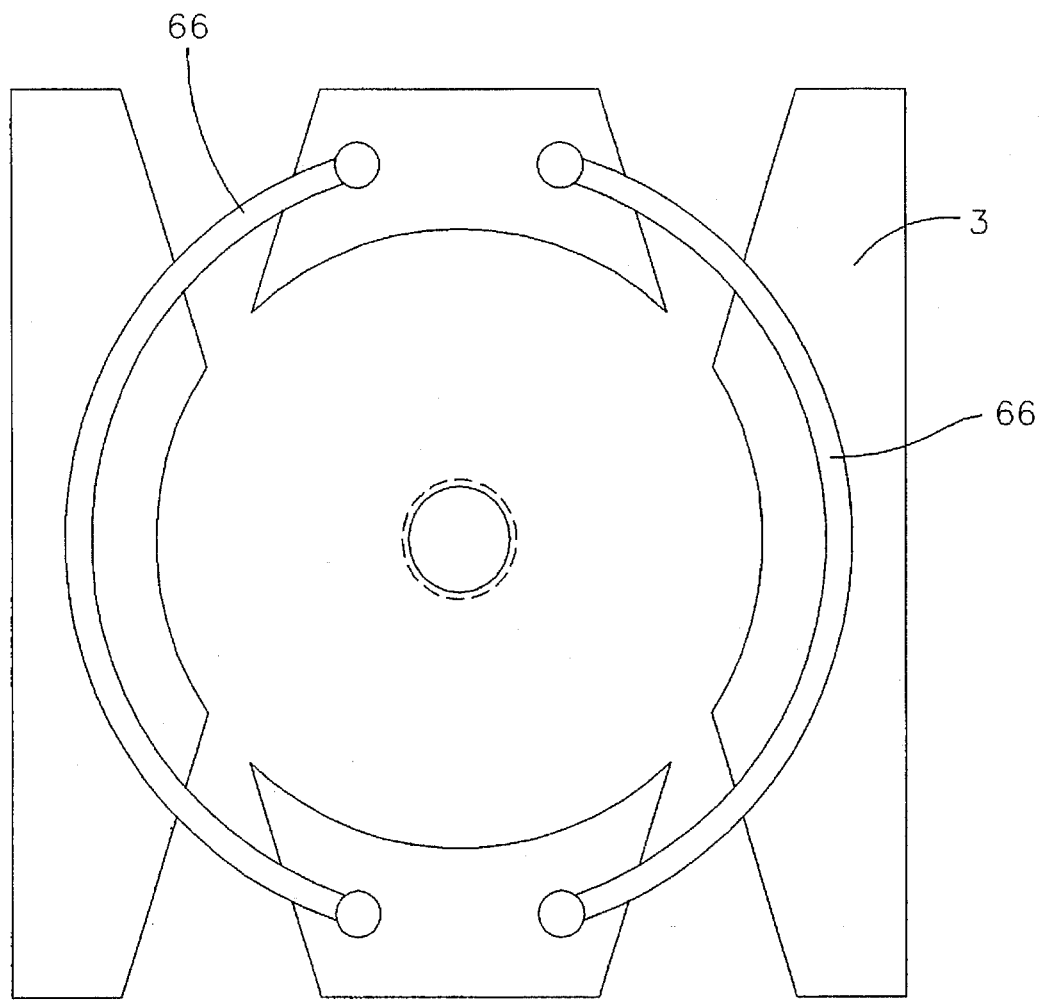
FIG. 5 is a top plan view of an engine block showing cooling channels, according to another embodiment of the present invention.

FIG. 5 is a schematic top plan view of the engine block 3 showing the cooling channels 66 for the engine block. The cooling channels 66 accommodate flow therethrough of a suitable coolant medium, e.g., antifreeze, oil or other fluid heat transfer medium. The cooling passages 66 on the left-hand and right-hand sides of the schematic drawing of FIG. 5 together provide a double loop coolant path comprising cooling loop portions which may, by suitable valve and control means, be isolated in relation to each other, whereby back-up cooling capacity can be provided within the rotary engine system, or alternatively, the full extent of the coolant flow path may be utilized in normal operation, with isolation of a portion of the fluid flow path in the event leakage occurs in such portion of the overall coolant flow loop.

Figure 6:
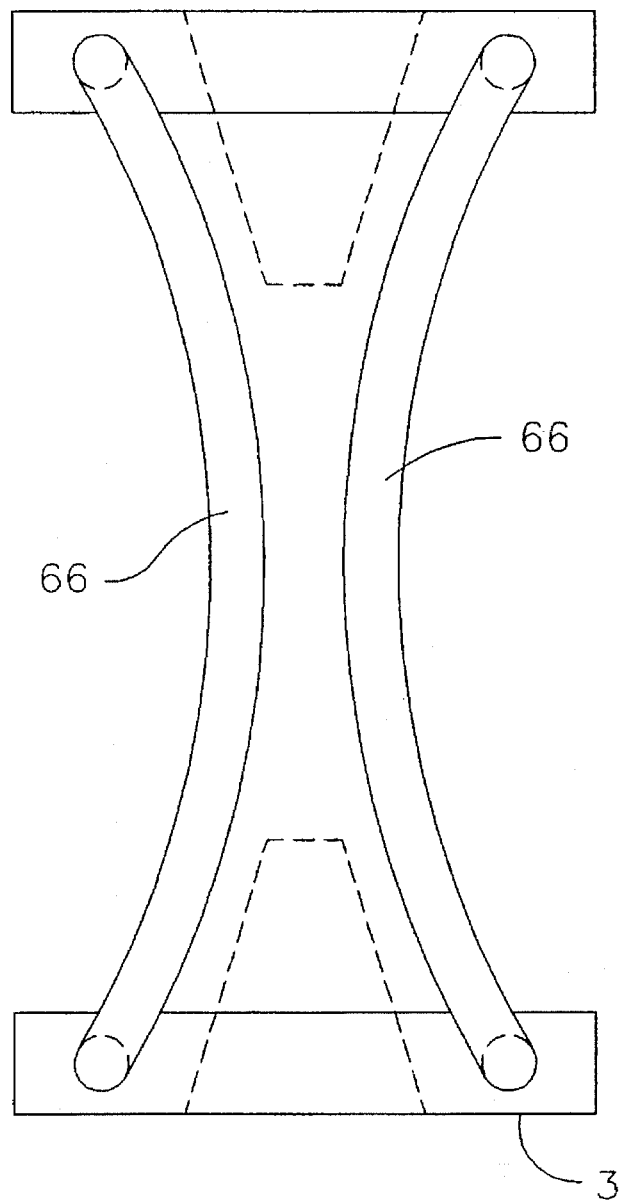
FIG. 6. is a side elevation view of the structure of FIG. 5, showing cooling channels thereof.

FIG. 6 is a schematic side elevation view of the engine block of FIG. 5 showing cooling channels 66.

Figure 7:
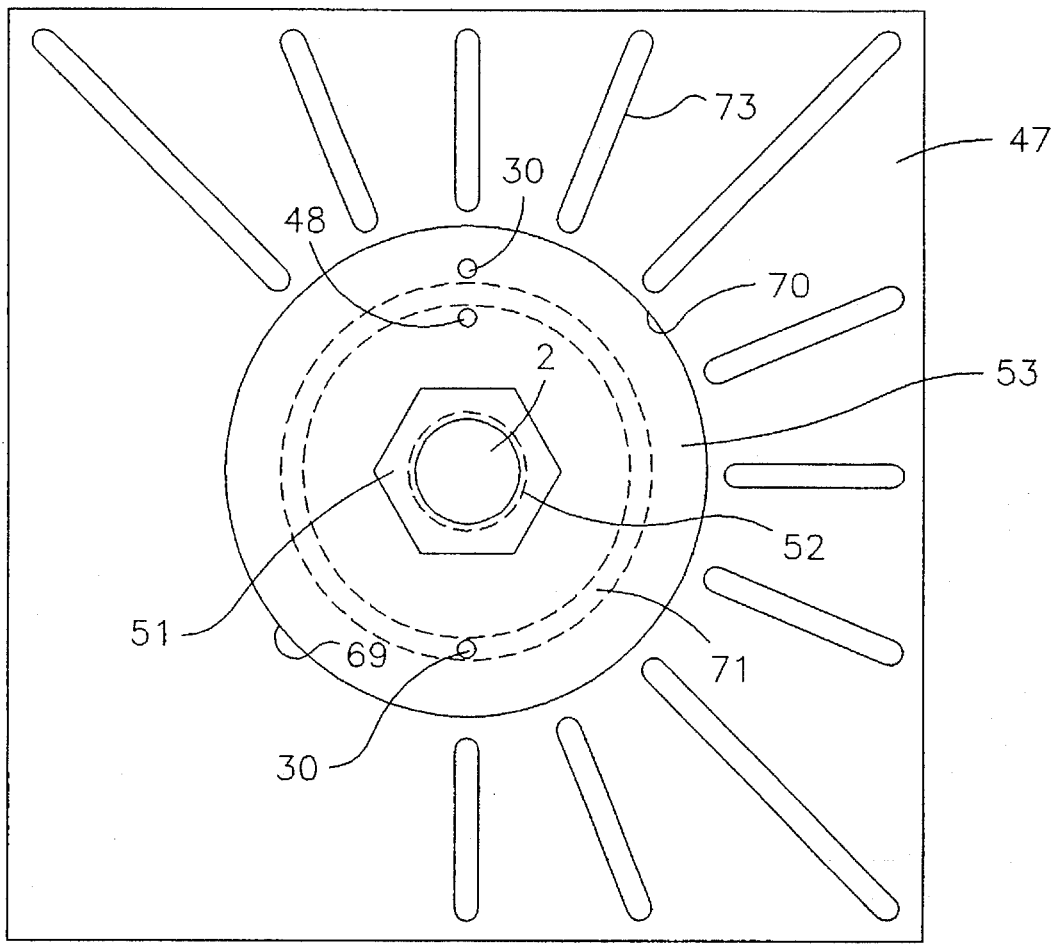
FIG. 7 is a top plan view of an engine cover featuring cooling fins.

FIG. 7 is a plan view of an engine cover 47 according to one embodiment of the invention, featuring cooling fins 73 thereon. The cooling fins 73 may be arranged in any suitable arrangement as necessary or desirable to effectuate heat transfer and achieve the requisite cooling of the engine in operation. The seal 53 at its peripheral portion 69 is threaded complementarily to threaded surface 70 of the engine cover 47, for matable engagement therewith by means of threading 50 (not shown in FIG. 7; see FIG. 4). The shaft 2 of the rotary engine extends through the hex nut 51, which compressively retains the sealing gasket 52 in position for sealing of the shaft. The plug 53 on an interior main face thereof may be provided with a seal groove 71, as shown, for mating with a cylinder seal (not shown). The oil inlet passage 48 is shown on the front face of the plug 53, together with the oil outlet openings 30. As mentioned, the oil inlet and outlet openings are suitably connected by passage means to an oil filter and oil reservoir, to effectuate circulation of lubricant medium through the lubricant surfaces of the plug, bearing, and the interior shaft surfaces of shaft 2.

By this arrangement, the plug 53 is readily removable, by appropriate loosening of the hex nut, to access the interior seals and bearings, at both the front and rear faces of the rotary engine. The seals and bearings may thus be removed on both faces and readily replaced, thereby obviating major overhauls of the engine for such purpose.

Figure 8:
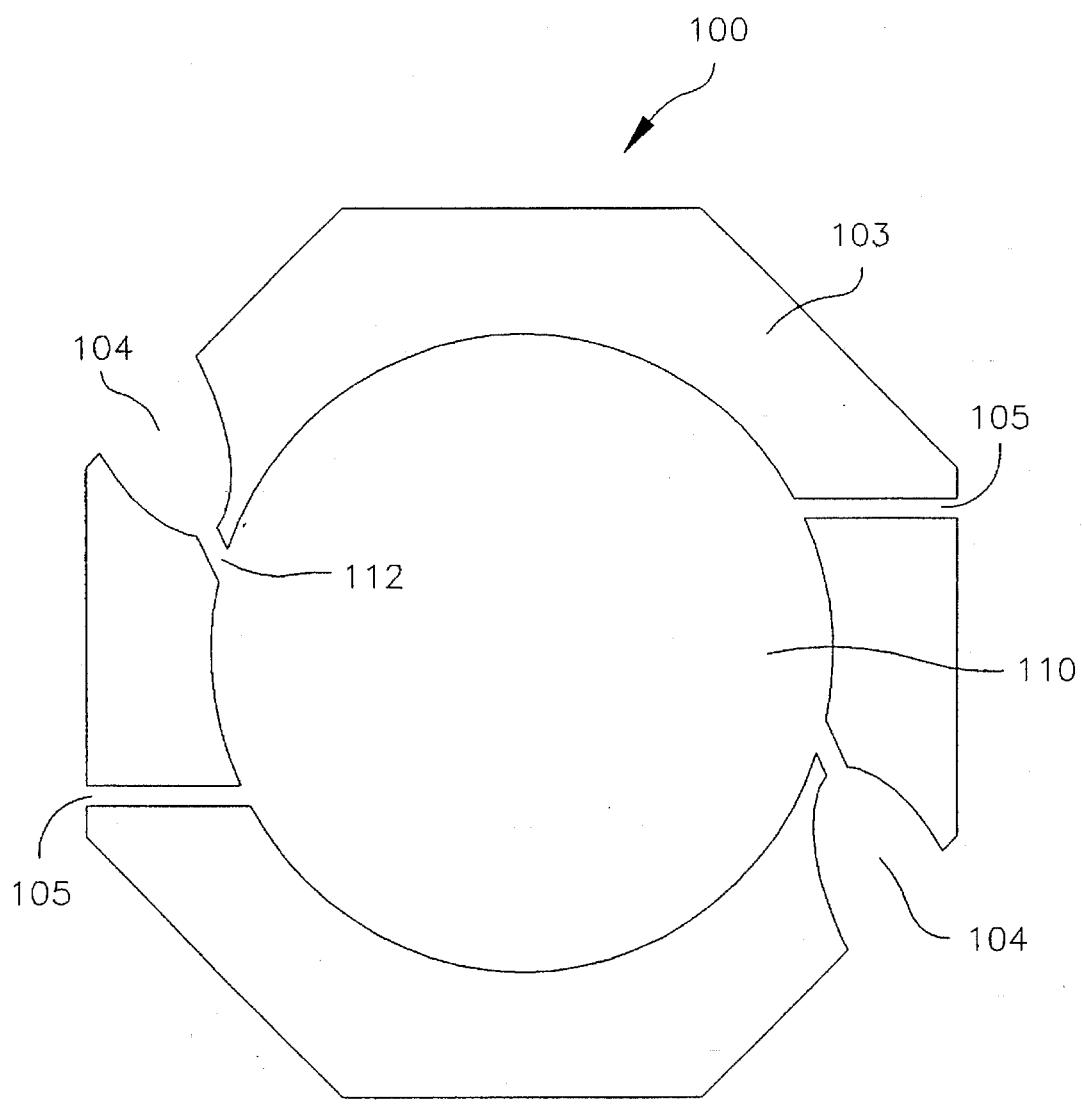
FIG. 8 is a top plan view of an engine block constructed in accordance with the present invention, in one embodiment thereof.

FIG. 8 shows a schematic plan view of a rotary engine 100 according to one embodiment of the invention, comprising engine block 103 having combustion chambers 104 diametrically opposing one another, and exhaust chambers 105, arranged as illustrated. The engine block 103 in this embodiment circumscribes an interior volume 110 in which is disposed the rotor of the engine (not shown for clarity in FIG. 8). The interior volume cavity 110 may in the embodiment shown be of any suitable diameter, as appropriate to the desired power output for which the engine is intended. As shown, the combustion chamber inlets to the interior volume cavity 110 are generally convergently shaped from their outer extremities to an interior injection port 112, which is angled along a chord of the circle defined by the interior volume cavity 110 (in the drawing), so as to impart a corresponding tangential force on the projections of the rotor as the engine operates, whereby the rotor is impelled by the expanding combustion gases from combustion chamber 104 so that the rotor is driven at appropriate speed, with exhaust of combustion gases in exhaust chambers 105. Thus, the engine receives an air/fuel mixture at an injection port associated with the combustion chambers 104. The combustion caps, as shown and described with reference to FIG. 1, includes ignition means for igniting the air/fuel mixture, to effect combustion of the fuel.

Figure 9:
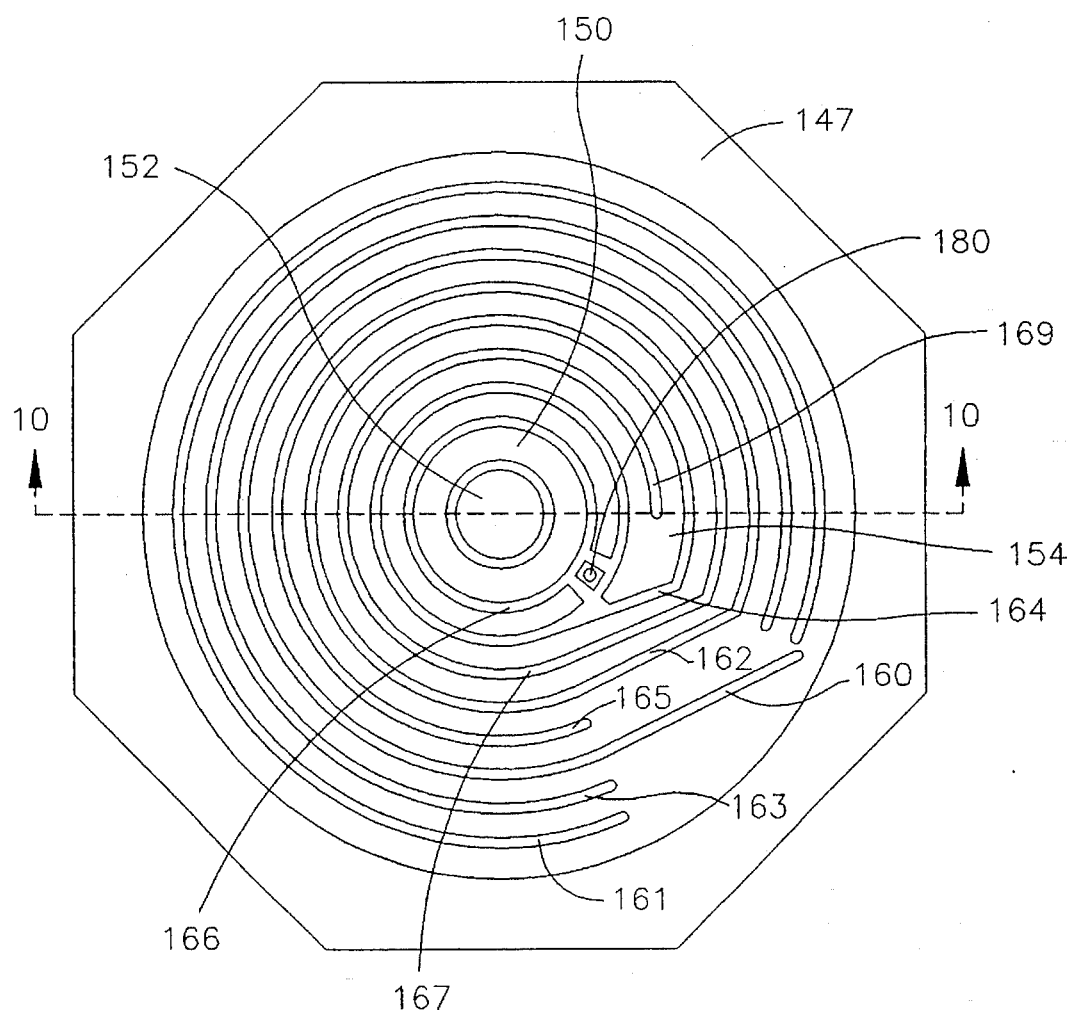
FIG. 9 is a plan view of a an engine cover comprising cooling channels therein.

FIG. 9 is a plan view of an engine cover 147 showing the cooling channels 116 thereof, through which a suitable coolant fluid may be flowed to provide dissipation of engine heat, and to maintain engine temperatures at permissible operating levels. The engine cover 147 has a central opening 152 to accommodate the rotor shaft of the engine. Surrounding the shaft opening is a race seating surface 150.

The coolant injection passage 180 is arranged to receive coolant, and to flow same in the coolant passages 154. The surface of the engine cover 147 is covered over a major portion of its main surface shown in FIG. 9 with a plurality of coolant fins 161, 163, 165, 167, and 169, which are interspersed with coolant passage walls 160, 162, 164 and 166, as illustrated.

The coolant medium employed for flow through the coolant passages of the engine cover 147 may comprise a suitable coolant medium of conventional type, e.g., a glycol-based aqueous solution, or alternatively, the oil which is introduced to the shaft and bearing surfaces through the openings in the removal plug, as described in connection with FIGS. 4 and 7 hereof, may be circulated through the heat transfer passages of the cover 147.

Figure 10:
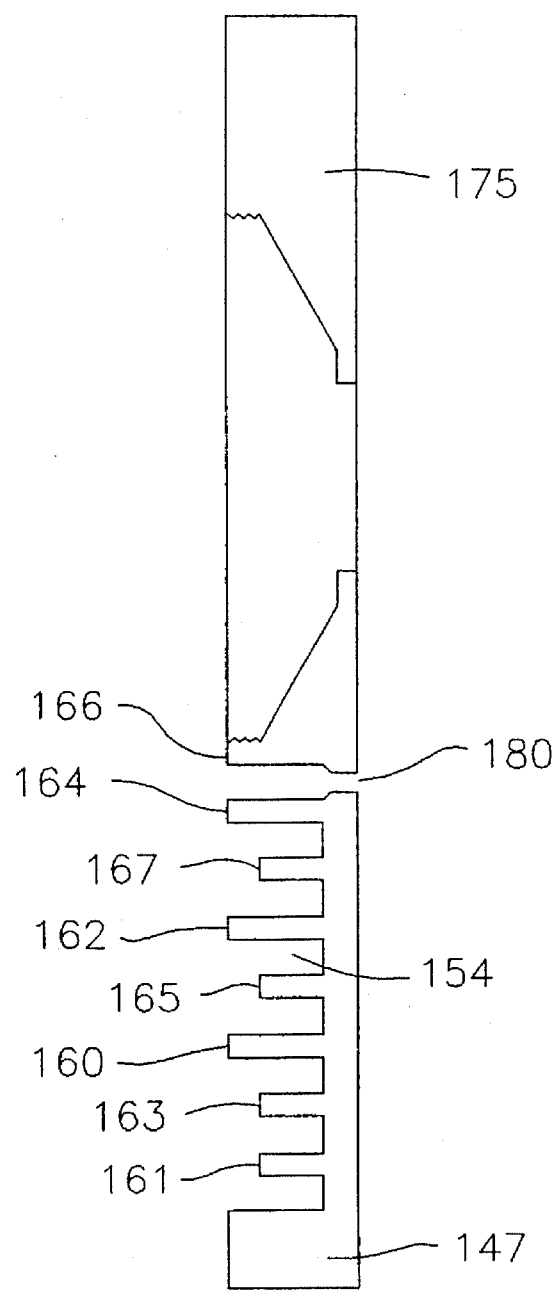
FIG. 10 is a side elevation view, taken along line 10—10 of FIG. 9.

FIG. 10 is a side elevation view, taken along line 10—10 of FIG. 9, showing the details of construction of the engine cover 147. In this side elevation view, the lower portion of the cover 147 is shown in detail, as regards the construction of the coolant passage walls and coolant fins, while the upper portion 175 of the engine cover is shown in schematic block form for simplicity, it being understood that the structure of the upper portion 175 is symmetric with respect to the lower portion featuring coolant fins 161, 163, 165, 167 and coolant passage walls 160, 162, 164 and 166.

Figure 11:
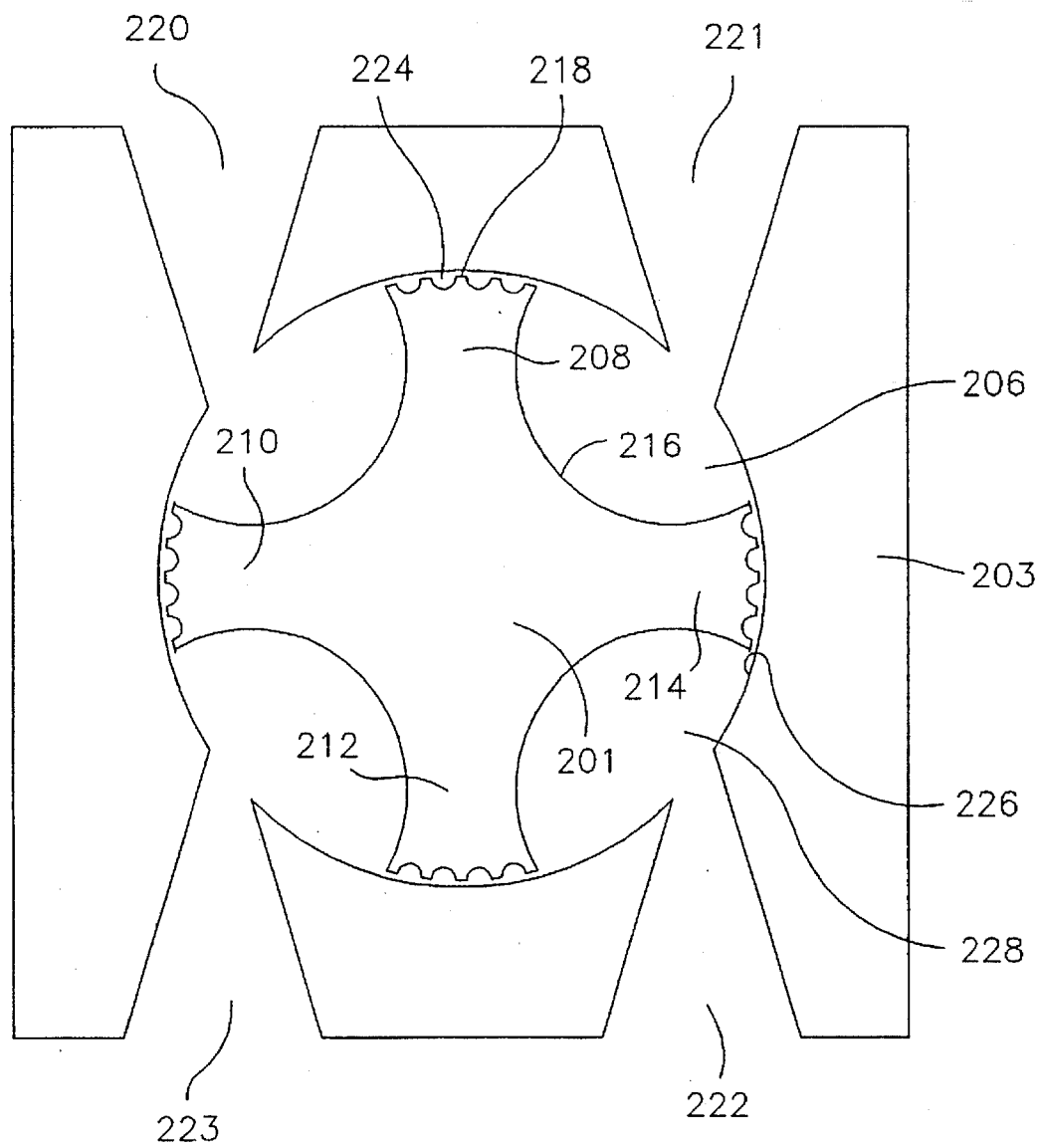
FIG. 11 is a top plan view of a cruciform-shaped rotor defining arcuate-shaped compartments and an engine block with the covers removed, in accordance with another embodiment of the invention.

FIG. 11 is a schematic top plan view of a rotor 201 of cruciform shape defining arcuate-shaped compartments 206, and associated engine block 203 with the covers removed for ease of viewing.

As shown, the cruciform-shaped rotor 201 comprises four vanes or arms, 208, 210, 212, and 214, intermediate which are the arcuate-shaped compartments 206 bounded by the curvate inner bounding wall surfaces 216 of the rotor. Such inner bounding wall surfaces 216 of the rotor at the outer extremity of the rotor arms is generally perpendicular to the outer curvate surface 218 of the arm, the outer wall surface 218 being convex (cylindrical) in conformation. The arcuate bounding wall surface 216 may be a circular arc in plan view, as shown, and the rotor and engine block 203 may have a suitable thickness perpendicular to the plane of the page containing FIG. 11.

When chamber 220 is employed as a combustion chamber, chamber 223 can correspondingly be used as an exhaust chamber and the direction of rotation will be counterclockwise with respect to the top plan view of the rotor as shown in FIG. 11. Conversely, when chamber 221 used as a combustion chamber, chamber 222 can be used as an exhaust chamber and the direction of rotation will be clockwise with respect to the view of the rotor shown in FIG. 11. Alternatively, the chambers could be differently arranged to produce an identical effective rotational motion to the embodiments just described.

The above-described arrangement of the rotary engine shown in FIG. 11 provides the engine with a braking mechanism, by use of the combustion chamber which is in direct opposition to the tangentially directed motion of the rotor 201.

In another variation of the structure shown in FIG. 11, chambers 220 and 222 may be utilized as combustion chambers, with chambers 221 and 223 functioning as exhaust chambers. This arrangement would effect counterclockwise rotation of the rotor with respect to the view shown in FIG. 11, but the rotary engine would not have its own internal braking mechanism. To effect clockwise rotation in such arrangement, the chambers could be reversed, or alternatively the rotary engine could be reversed in position to use the end of the shaft emanating from the side opposite that shown in FIG. 11. Preferably, the rotor is retarded (decelerated) or reversed in direction of rotation, by utilizing small "off-time" (in relation to the intake, combustion and expansion/exhaust cycle times) combustion explosion pulsations, so as not to put diametrally opposed forces on the rotor vanes or projections, such as may impair or damage the rotor.

As a further alternatively for effecting deceleration and/or reversal of rotation direction of the rotor 201, the extremities of the cruciform arms 208, 210, 212 and 214 may be provided on their outer circumferential surfaces 218 with one or more pockets 224 which may be of any suitable concave shape providing localized depression(s) in the surface 218 which is in facing relationship to the inner bounding surface 226 of the interior volume 228 of the rotary engine. The pockets 224 provide a means for receiving expanding combustion gases from the combustion chamber(s) which may be selectively timed (in respect of the firing/combustion sequence) to effect a retarding force and/or reversal force on the rotor 201. The firing/combustion sequence may for example be controlled by a microprocessor and/or computer control means (not shown).

While the rotor is shown in FIG. 11 as a unitary element, it will be recognized that the rotor may be separately formed from the rotor shaft, and may be mounted on the shaft in any suitable manner, e.g., by appropriate keying and set screw means, or other mechanical affixation arrangement.

Figure 12:
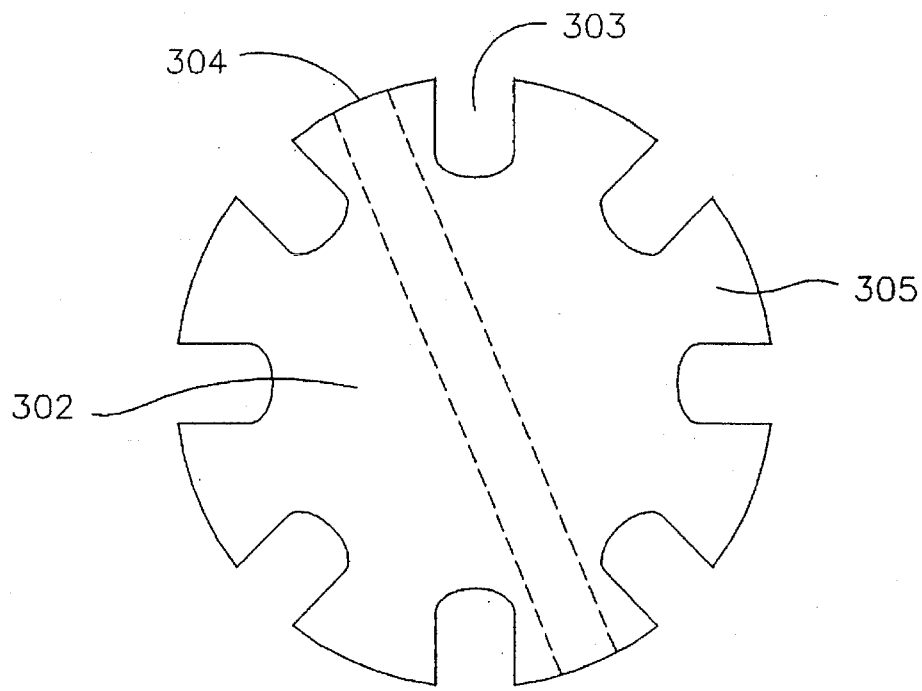
FIG. 12 is an end view of an engine shaft with a plurality of keyways.

FIG. 12 is an end view of an engine shaft 302 which may be utilized in the practice of the present invention, in connection with the rotors illustratively described herein. As shown, the engine shaft 302 has a plurality of keyways 303 in the form of longitudinal grooves at the outer periphery 305 of the shaft, and an aperture 304 in which can be disposed a suitable connecting means or mechanism (not shown in FIG. 12).

Figure 13:
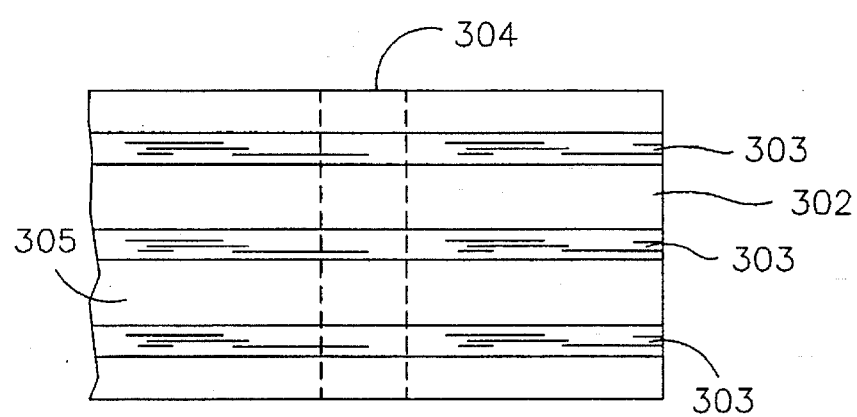
FIG. 13 is a side elevation view of the engine shaft of FIG. 12.

FIG. 13 is a side elevation view of engine shaft 302 shown in FIG. 12, showing the plurality of keyways 303 and the aperture 304 in which suitable connecting means or mechanisms may be disposed (again not shown, for clarity).

Figure 14:
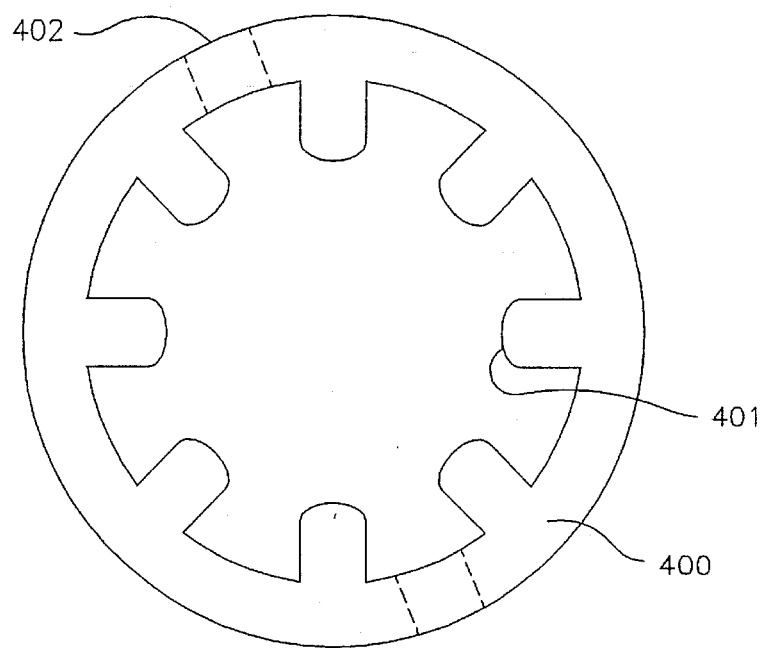
FIG. 14 is an end view of a coupling element with a plurality of internal grooves and ridges, including an optional breakaway groove.

FIG. 14 is an end elevation view of a coupling element 400 with a plurality of internal ridges 401 and an aperture 402 in which can be disposed a suitable connecting means or mechanism (not shown).

Figure 15:
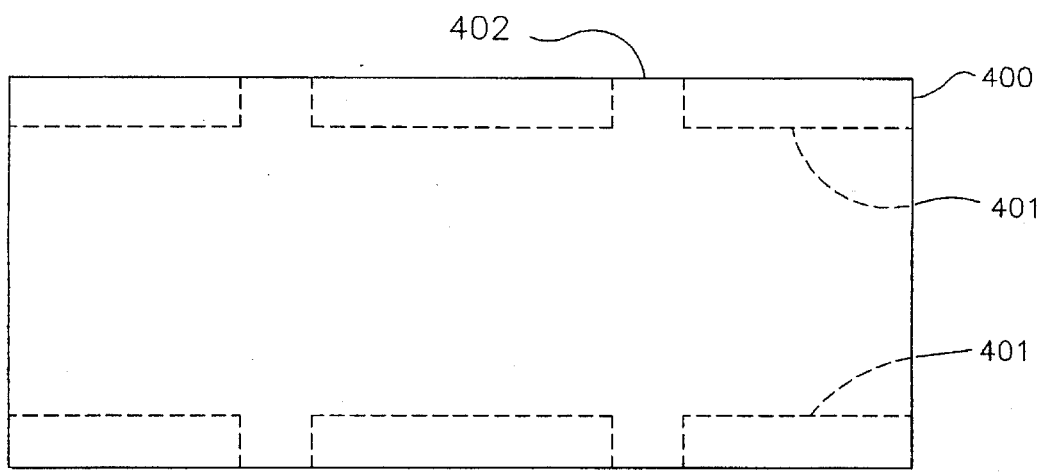
FIG. 15 side elevation view of the coupling element of FIG. 14.

FIG. 15 is a side view of the connector element of FIG. 14, wherein the coupling element 400 is shown as adaptable for mating with the "keyed" shaft 302 shown in FIGS. 12 and 13, and having an aperture 402 in which a suitable connecting means or mechanism can be disposed (not shown), such as locking pins or bolts, or other mechanical fastener means. As mentioned hereinearlier, the connector element may comprise a torque-regulated breakaway coupling, so that if one or more rotary engine modules in a multi-module train bind or seize, the coupling will shear, so that power train performance, while attenuated, will not be interrupted.

Figure 16:
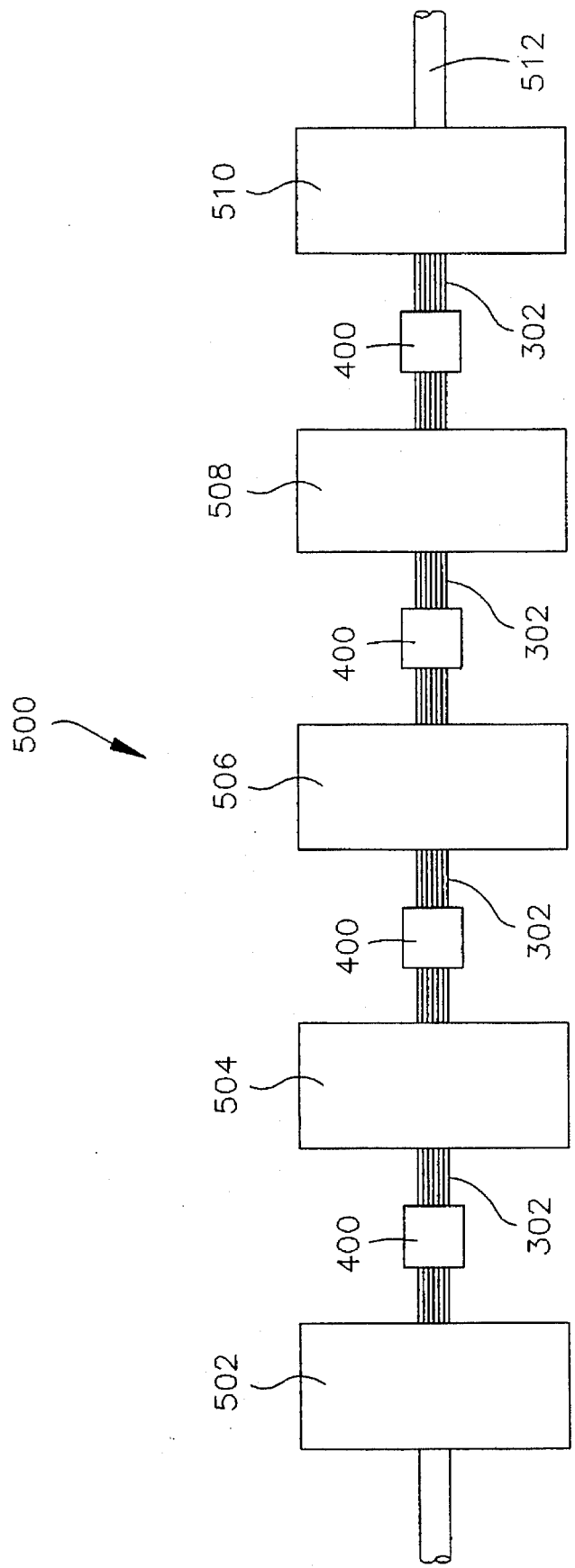
FIG. 16 is a schematic illustration of a power train assembly according to the invention, comprising a plurality of rotary engine modules interconnected with one another.

It will be appreciated from the foregoing, that the rotary engine of the present invention may be usefully employed in a stacked or "series" train configuration, as illustratively shown in FIG. 16, wherein the power train assembly 500 comprises rotary engine modules 502, 504, 506, 508 and 510 constructed in accordance with the invention and operatively interconnected by means of coupling elements 400 to provide a composite rotor shaft 512, made up of component rotor shafts 302 of the constituent rotary engine modules, whereby the rotor elements in the respective modules 502, 504, 506, 508 and 510 are operatively coupled for conjoint rotation about the axis of the composite shaft 512.

Figure 17:
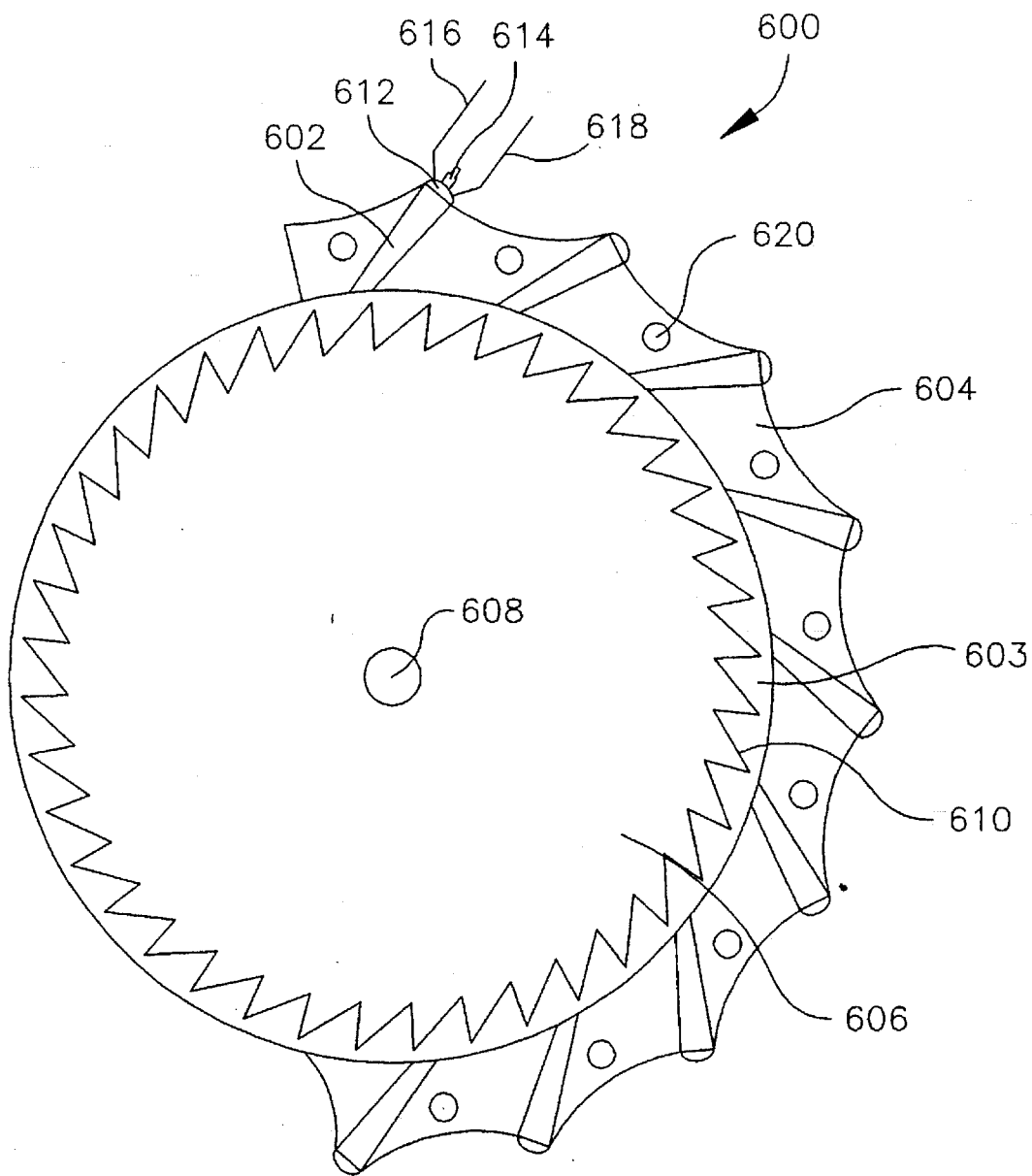
FIG. 17 is a schematic illustration of a cylindrical engine block featuring a sawtooth-vaned rotor mounted on a shaft in the interior volume of the engine block.

FIG. 17 is a schematic illustration of a cylindrical engine block 600 comprising a generally cylindrical housing 604 featuring a plurality of combustion chambers 602 arranged in circumferentially spaced-apart relationship to one another about the periphery of the engine block. The engine block defines therewithin an interior volume 603 containing a sawtooth-vaned rotor 606 mounted on a shaft 608 in the interior volume of the engine block. The sawtooth-vaned rotor of this embodiment of the invention, in contrast to the earlier described embodiments, utilizes a rotor comprising a fine-tooth projection arrangement, in which the projection vanes 610 extend only partially radially inwardly from the outer periphery of the rotor, illustrating that the rotor may be widely varied in shape and structure, within the broad scope of the invention.

In the FIG. 17 embodiment, the combustion chambers 602 are each provided with a combustion cap 612 which may threadably engaged with suitable threading at the upper extremity of the combustion chamber, to mechanically couple the cap with the combustion chamber in the cylindrical housing 604. Each combustion cap 612 is provided with air/fuel mixture combustion ignition means 614, such as a conventional spark plug, connected by suitable wires (not shown) to an electrical system for selective spark generation in the combustion chamber. The combustion cap 612 of each combustion chamber sub-assembly is provided with a fuel inlet passage 616 and an air (or other oxygen-containing gas) feed passage 618, which may be selectively utilized with an appropriate fuel injection system (not shown) to optimize fuel efficiency and combustion in operation of the engine.

The housing 604 of the engine shown in FIG. 17 is provided about its periphery with coolant ports 620 through which coolant may be flowed to provide heat transfer cooling of the engine housing. The engine shown in FIG. 17 comprises combustion chambers which are sequentially arranged around a portion of the circumference of the cylindrical housing 604, it being understood that combustion chambers may be provided on the remainder of the circumference of the housing, or alternatively, the housing along such other circumferential portion may be devoid of combustion chambers, as appropriate to the end use application of the rotary engine. Such other portion of the circumference may for example comprise combustion chambers which are oriented in an opposite angular orientation to the orientation of combustion chamber 602, to provide for braking of the rotor 606 in operation.

Figure 18:
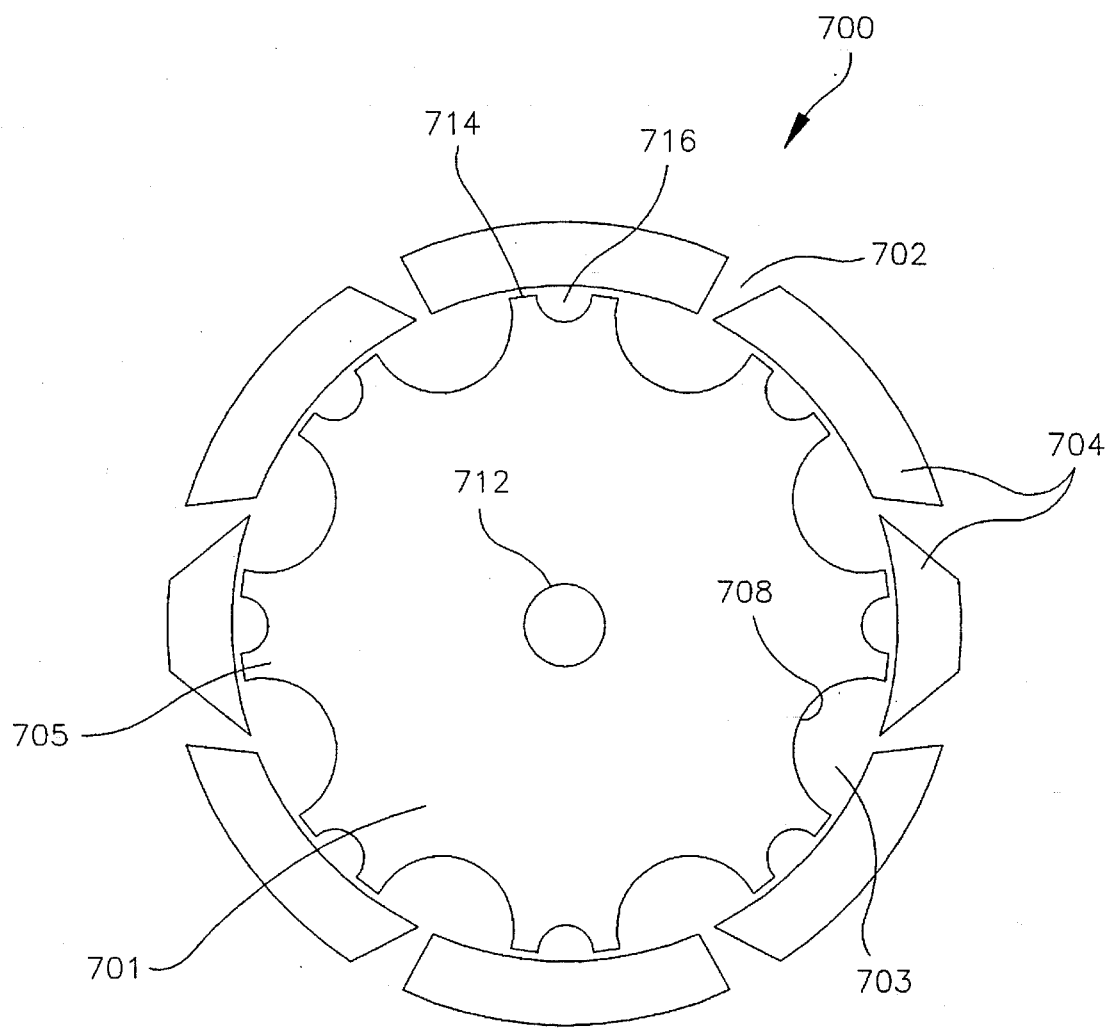
FIG. 18 is a schematic illustration of another rotor and engine block embodiment, such as may be usefully employed in the broad practice of the invention.

FIG. 18 is a schematic illustration of another embodiment of a rotary engine 700 of the invention, comprising rotor element 701, featuring a series of circumferentially spaced-apart "shallow" projections 705 (extending only partially radially inwardly from the outer periphery of the rotor). These projections define a corresponding series of arcuate compartments 703 which receive expanding combustion gases from the combustion chambers 702 in the housing 704 of the rotary engine in which such rotor is disposed, in such fashion as to impart a motive rotational force on the projection surfaces 708 bounding the compartments 703, and effect the desired rotational movement of the rotor.

The combustion chambers 702 in the rotary engine 700 of FIG. 18 may be provided with combustion caps, as described hereinearlier with respect to other embodiments of the invention. The various ports about the circumference of the housing 704 may be utilized for combustion chambers or exhaust chambers, depending on the end use application and desired characteristics of the engine. In the FIG. 18 embodiment, the rotor is integrally formed with, or mounted on, rotary shaft 712. The rotary projections 705 on their peripheral surface portions 714 are provided with braking pockets 716, as shown. By means of the braking pocket configuration, the ignition/combustion sequence may be selectively controlled to impinge combusting and expanding gases on the pockets of the successive projections 705, to thereby effect retardation of rotational speed of the rotor 701. As discussed hereinabove, the firing/ignition sequence associated with injection of combustion fuel and oxygen-containing gas to the combustion chamber may be selectively controlled by suitable microprocess or and/or computer means (not shown), to effectuate braking, acceleration, and reversal of rotational direction of the rotor 701.

Figure 19:
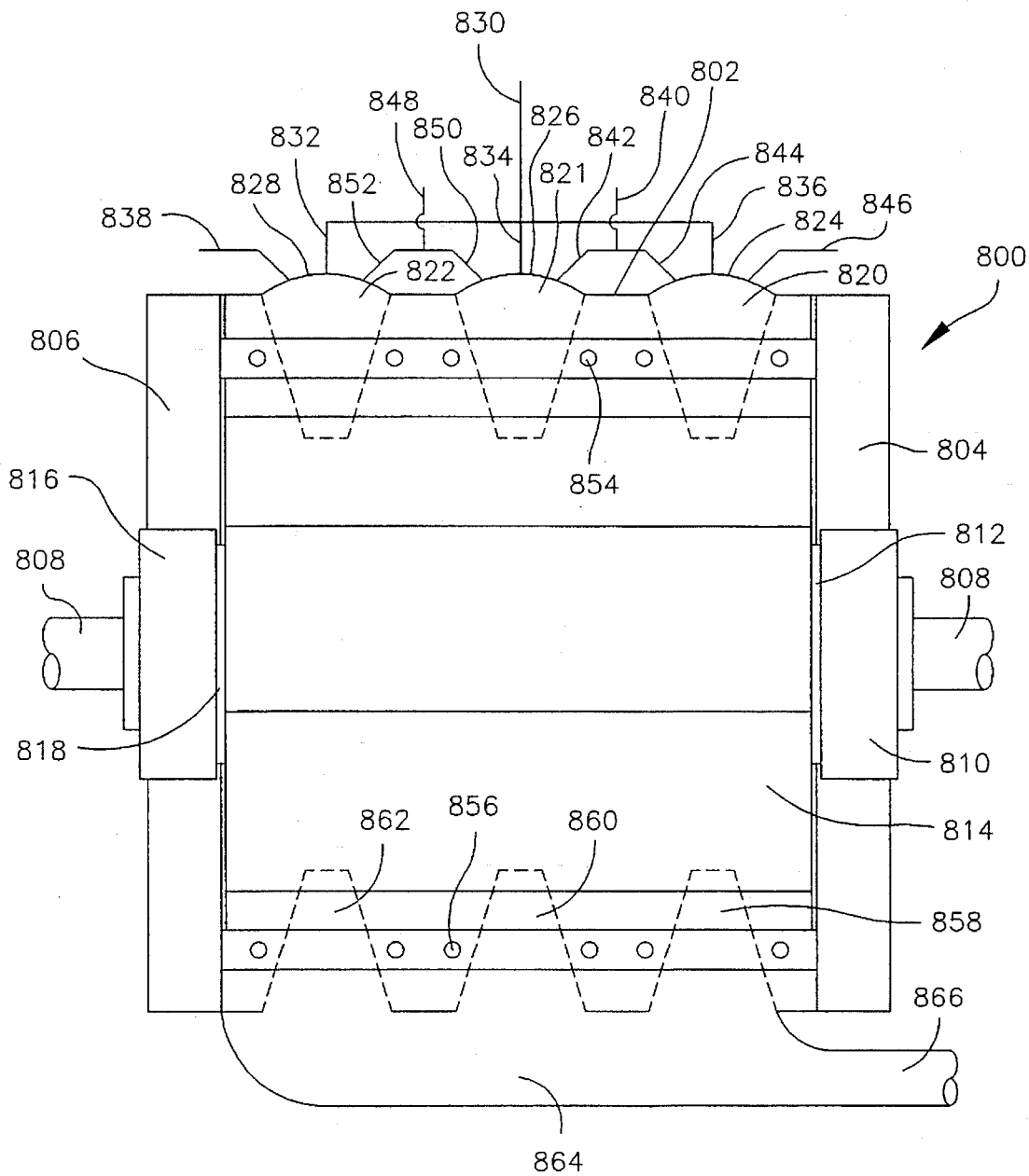
FIG. 19 is a partial cross-sectional elevation view of a rotary engine according to another embodiment of the invention.

FIG. 19 shows a partial sectioned elevation view of a rotary engine 800 according to another embodiment of the invention.

The rotary engine 800 comprises an engine block 802 defining a cavity therewithin containing the rotor 814. The engine block 802 is mated on its opposite faces with removable end plates 804 and 806, each of which is fabricated to accommodate plug elements 810 and 816, respectively, in a central opening thereof, in the same manner as previously described in connection with other embodiments of the invention. Thus, the shaft 808 passes through the plug 810 on the right-hand plate 804, and passes through associated seal 812, for communication with the rotor 814 disposed in the interior volume cavity. At its opposite face, the shaft 808 extends through plug 816 and seal 818, in a like manner.

The engine block 802 is provided with combustion chambers 820, 821, and 822, as shown, each of which is associated with coolant ports 854. Each of the combustion chambers 820, 821 and 822 is provided with a respective combustion cap 824, 826 and 828. Fuel line 838 is connected in fluid flow communication with combustion chamber 822. Fuel is also delivered in feed conduit 840 communicating with branch feed lines 842 and 844, to supply fuel to combustion chambers 821, and 820, respectively. In analogous fashion, air or oxygen-containing gas is flowed to combustion chamber 820 in gas feed line 846, and main gas feed line 848 is joined to branch feed gas conduits 850 and 852, to supply air or oxygen-containing gas to combustion chambers 821 and 822, respectively.

Electrical feed wire 830 is joined to branch cables 832, 834, and 836, which in turn are joined to ignition means (not shown) to ignite the air-fuel mixture in combustion chambers 822, 821 and 820, respectively.

At its lower portion, the engine 800 comprises exhaust chambers 858, 860 and 862, communicating with exhaust manifold 864 and exhaust conduit 866, as illustrated. The exhaust chambers 858, 860 and 862 are disposed in heat transfer (cooling) relationship to coolant ports 856, to provide cooling to the engine and maintain its operating temperature at permissible levels.

Figure 20:
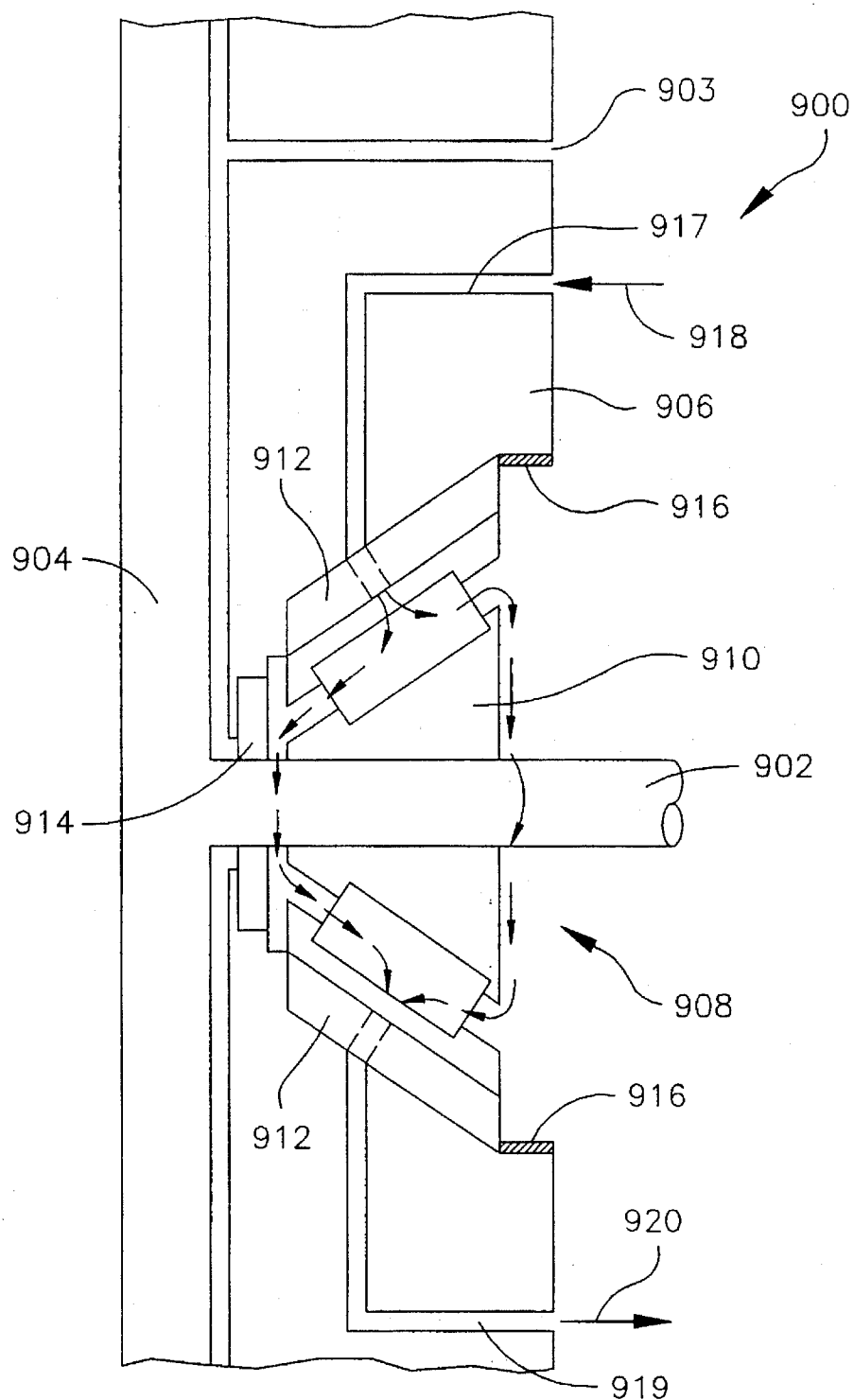
FIG. 20 is a partial sectional elevation view of a bearing and seal assembly of a rotary engine according to another embodiment of the invention.

FIG. 20 is a partial sectioned elevation view of a bearing and seal assembly of a rotary engine 900 according to another embodiment of the present invention.

The rotary engine 900 comprises a shaft 902 coupled to a "pinwheel" 904 which may be fabricated with a vaned structure as hereinearlier described. The cover 906 of the engine 900 features a bearing cavity 908 which is threaded at its outer circumferential portion 916, as shown.

The bearing cavity 908 contains a roller bearing 910 mounted on shaft 902, adjacent to race 912 accommodating such bearing. A seal element 914 is provided at a lower portion of the bearing cavity 908, about shaft 902. An oil feed line 917 is provided in cover 906, passing through race 912 for discharge of oil onto the roller bearing 910, with the flow of oil over the bearing 910 and shaft 902 being indicated by arrows. The oil after traversing the roller bearing 910 and shaft 902 passes through a passage in race 912 opposite the feed passage 917 (into which oil is flowed in the direction indicated by arrow 918), and the oil finally is flowed through discharge passage 919 for outflow from passage 919 in the direction indicated by arrow 920. The cover 906 is provided at its upper portion with a test passage 903, to test the sealing character of the seal ring element 914.

Figure 21:
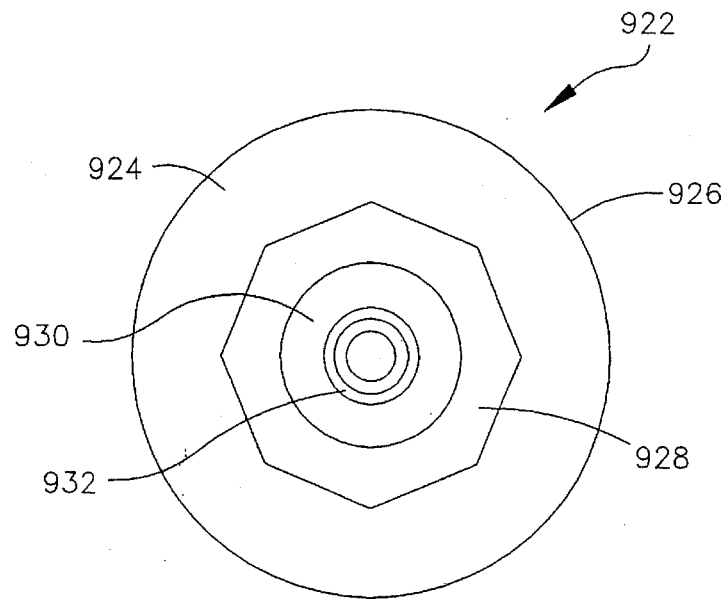
FIG. 21 is a front elevation view of a plug unit adapted to be coupled with the bearing and seal assembly of FIG. 20.

FIG. 21 is a front elevation view of a plug unit adapted to be coupled with the bearing and seal assembly of FIG. 20. For such purpose, the plug unit 922 is provided with a threaded outer peripheral surface 926 engaging threaded outer portion 916 of the bearing cavity 908 (see FIG. 20). The main body portion 924 of plug 922 features on its face a hexagonal nut protrusion 928, for engagement with a wrench or similar means, to effect removal or installation of the plug in the bearing cavity. The hexagonal nut protrusion 928 circumscribes a rubber seal element 930, which is shaped as shown in FIG. 22 to contain therein a spring tensioning element 932 causing the rubber seal element 930 to circumferentially compressively bear on shaft 902.

Figure 22:
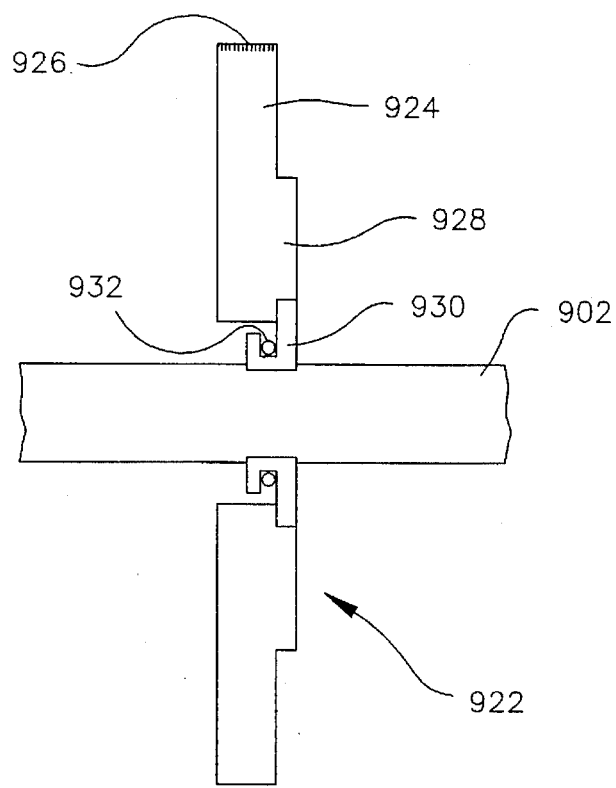
FIG. 22 is a partial section elevation view of the plug unit of FIG. 21 in operative position on a rotary engine shaft.

As shown in FIG. 22, the body 924 of plug 922 is provided with threading on its outer peripheral surface 926, by means of which the plug is readily threadably engaged with the threaded outer surface portion 916 of the bearing cavity 908. By this arrangement, the plug is readily installable in the bearing cavity, and is correspondingly readily removed therefrom, to access the roller bearing 910 and seal ring element 914. When the plug 922 is removed from the bearing cavity 908, a fluid test medium can be introduced under pressure to test passage 903 and thereby utilized to determine the sealing character of the seal ring element 914.

The present invention has been described with respect to specific aspects, configurations and embodiments, however it will be appreciated that numerous modifications, alternative configurations and other embodiments exist, and the invention therefore is to be broadly construed to encompass such variations, modifications, configurations and embodiments within its spirit and scope.

What is claimed is:

1. A rotary engine comprising:
   (i) a block including a cavity defining an interior volume therein;
   (ii) a rotor mounted for rotation in the cavity and defining a plurality of compartments circumferentially spaced about the periphery of the rotor;
   (iii) a plurality of fluid flow chambers in the block communicating with said cavity, and comprising fuel mixture intake/combustion chambers and at least one combustion gas exhaust chamber, wherein the fuel mixture intake/combustion chambers are constructed and arranged to deliver combustion gas into the cavity for impingement on the compartments to effect rotation of the rotor, and comprise fuel mixture intake/combustion chambers arranged in opposed flow direction relationship to one another so that one of said opposed flow direction fuel mixture intake/combustion chambers delivers combustion gas into the cavity for impingement on the compartments to effect rotation of the rotor in a first direction of rotation, and another of said opposed flow direction fuel mixture intake/combustion chambers delivers combustion gas into the cavity for impingement on the compartments to effect rotation of the rotor in a second direction of rotation opposite to the first direction of rotation, and wherein said opposed flow direction fuel mixture intake/combustion chambers are constructed and arranged to selectively deliver combustion gas in opposition to the direction of rotation of the rotor, to effect selective braking of the rotor in operation; and
   (iv) means for cooling said block to dissipate heat of combustion therefrom;

(v) a cover removably secured to said block and removable to access said cavity and rotor therein, said cover having a threaded central opening therein;

(vi) a shaft having said rotor mounted thereon, said shaft extending through said central opening in said cover; and (vii) a bearing seal plug threadably removably secured in said central opening in said cover, and comprising:
a main plug body member;
a bearing mounted in the main plug body member and arranged to supportively engage said shaft;
a seal assembly removably secured to the main plug body member to maintain the bearing in supportive engagement with said shaft; and
means for lubricating said bearing.

* * * * *